March 13, 1945.  A. H. GOREY ET AL  2,371,592

AUTOMATIC AERIAL CAMERA

Filed Feb. 19, 1943  15 Sheets-Sheet 3

INVENTORS:
Archie H. Gorey.
Louis D. Nadet.
Reynold J. Nitsch.
Oscar Steiner.
BY
Attys March 13, 1945.    A. H. GOREY ET AL    2,371,592
AUTOMATIC AERIAL CAMERA
Filed Feb. 19, 1943    15 Sheets-Sheet 7

INVENTORS.
Archie H. Gorey,
Louis D. Nadel,
Reynold J. Nitsch,
Oscar Steiner,
BY
Attys.

March 13, 1945.　　A. H. GOREY ET AL　　2,371,592
AUTOMATIC AERIAL CAMERA
Filed Feb. 19, 1943　　15 Sheets-Sheet 8
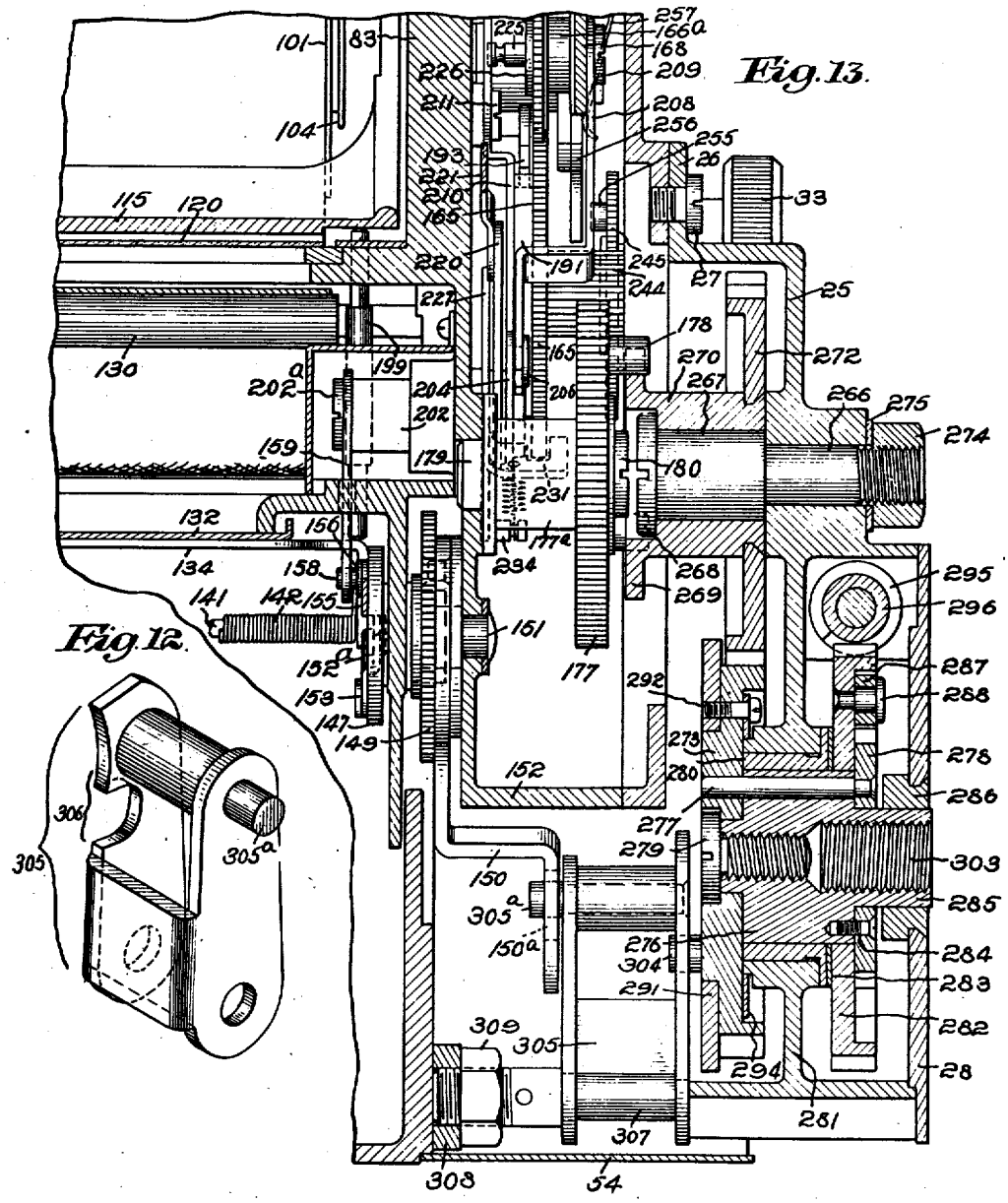
INVENTORS
Archie H. Gorey,
Louis D. Nadel,
Reynold J. Nitsch,
Oscar Steiner,
BY
Att'ys March 13, 1945.  A. H. GOREY ET AL  2,371,592
AUTOMATIC AERIAL CAMERA
Filed Feb. 19, 1943   15 Sheets-Sheet 9

INVENTORS
Archie H. Gorey,
Louis D. Nadel,
BY Reynold J. Nitsch,
Oscar Steiner,
Attys.

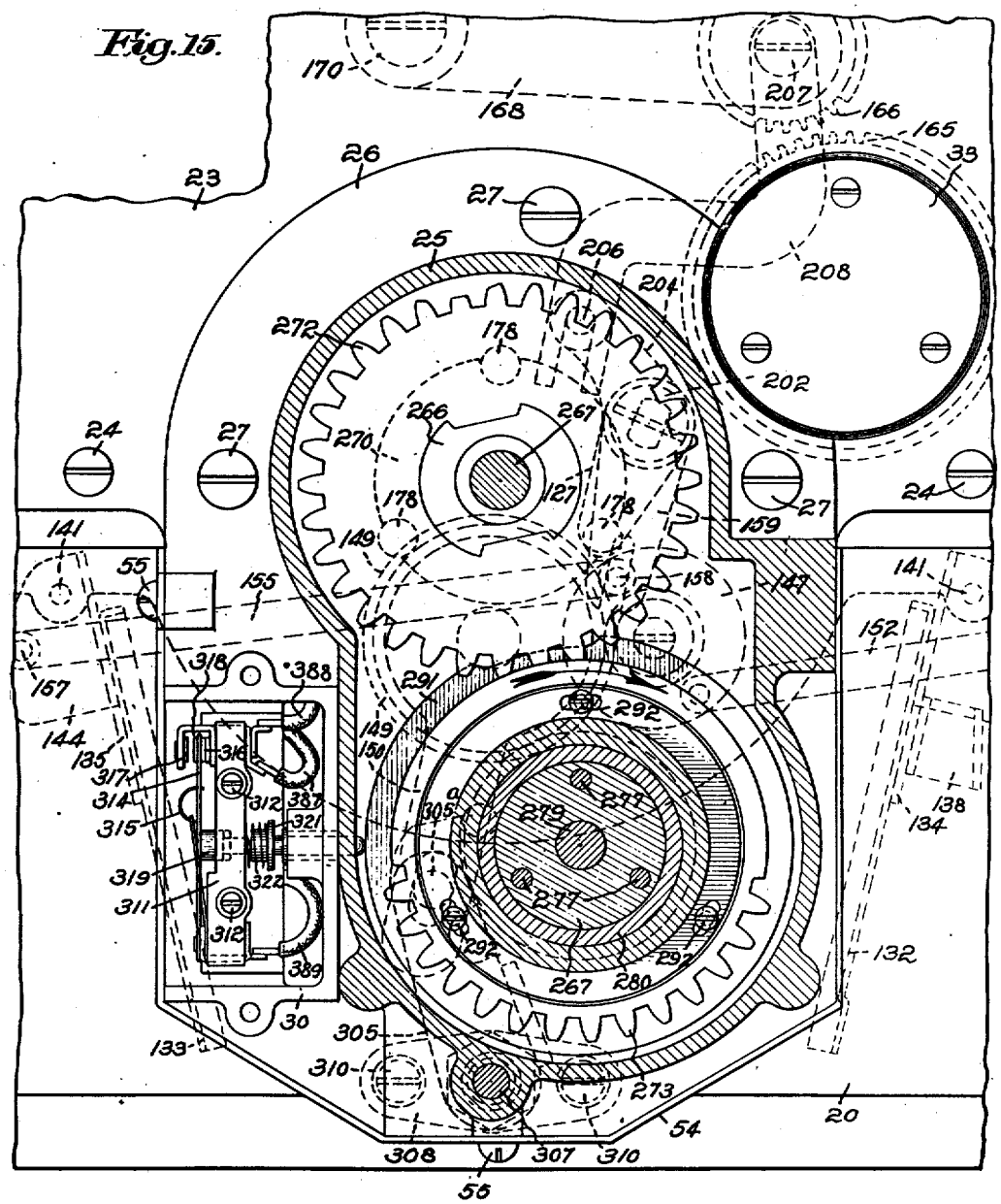

March 13, 1945.   A. H. GOREY ET AL   2,371,592
AUTOMATIC AERIAL CAMERA
Filed Feb. 19, 1943   15 Sheets-Sheet 11
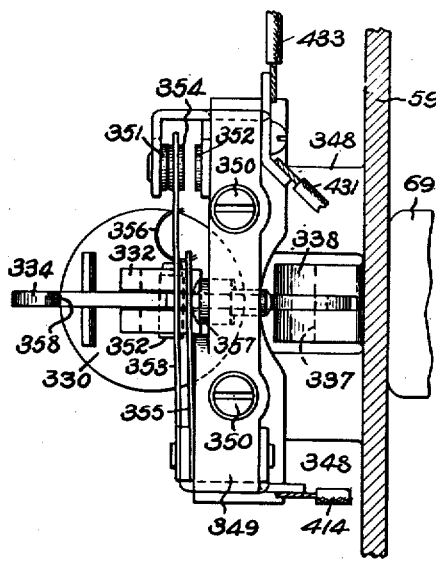
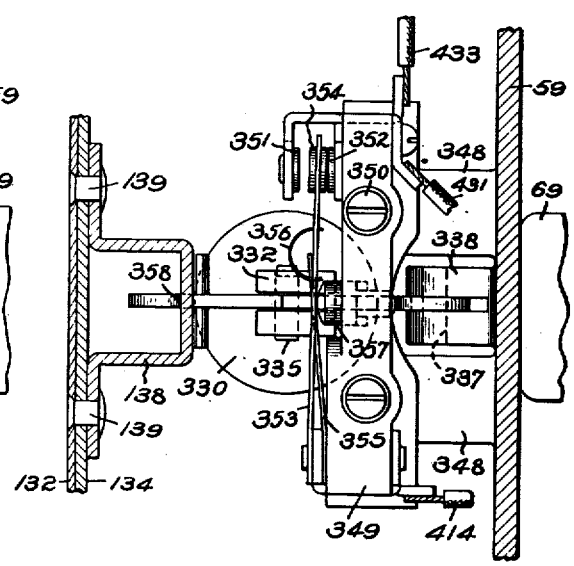
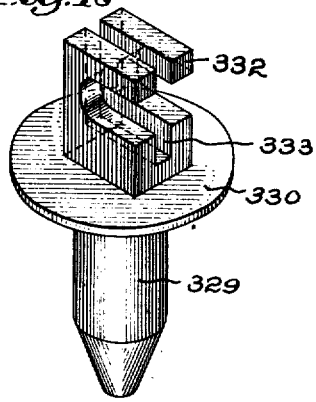
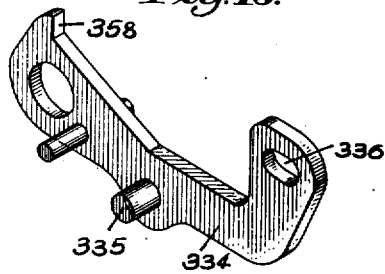
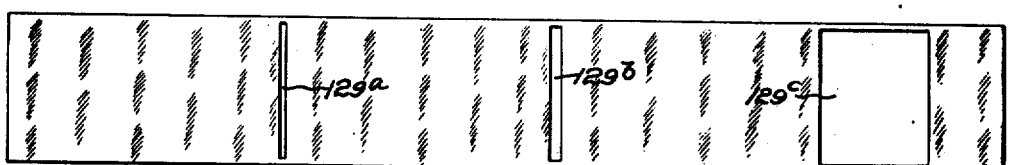
INVENTOR.
Archie H. Gorey,
Louis D. Nadel,
BY Reynold J. Nitsch,
Oscar Steiner,
Attys.

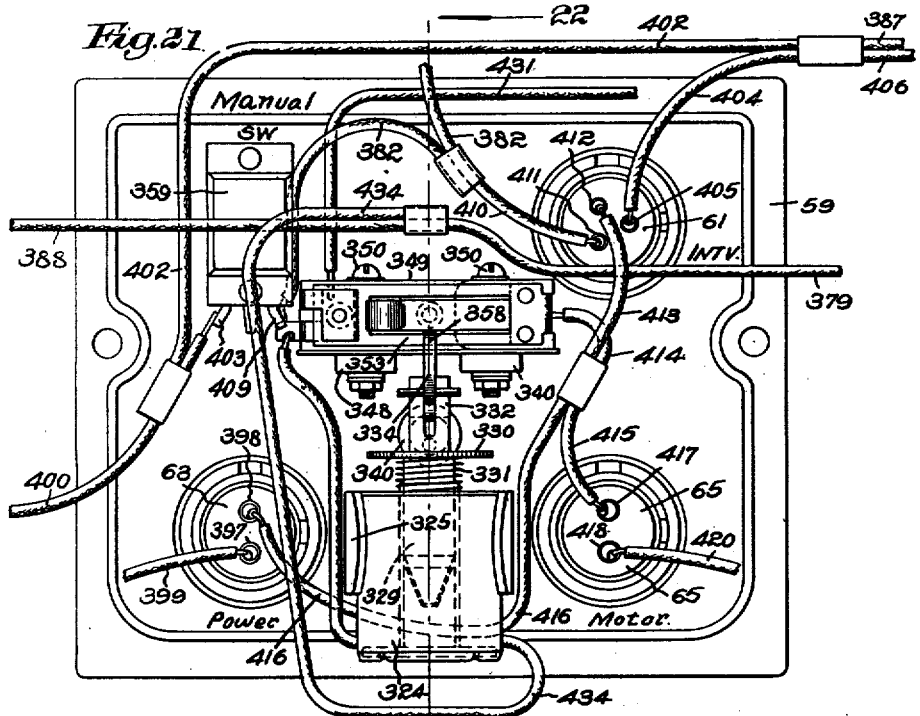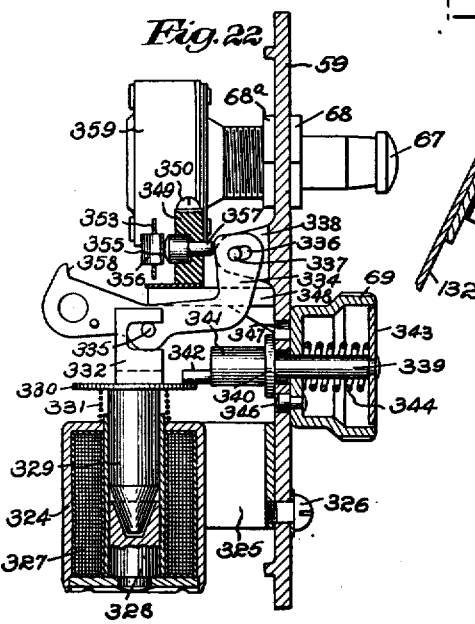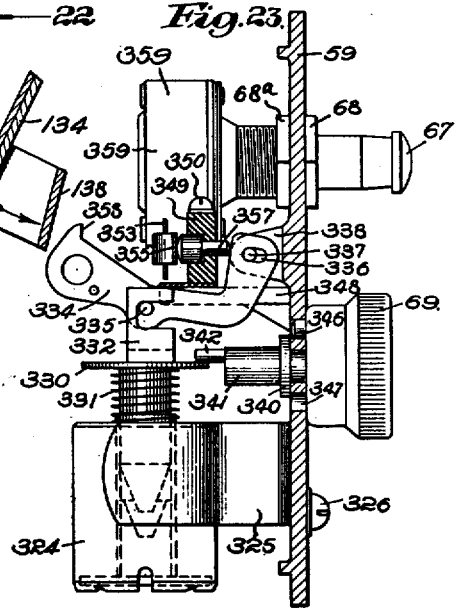

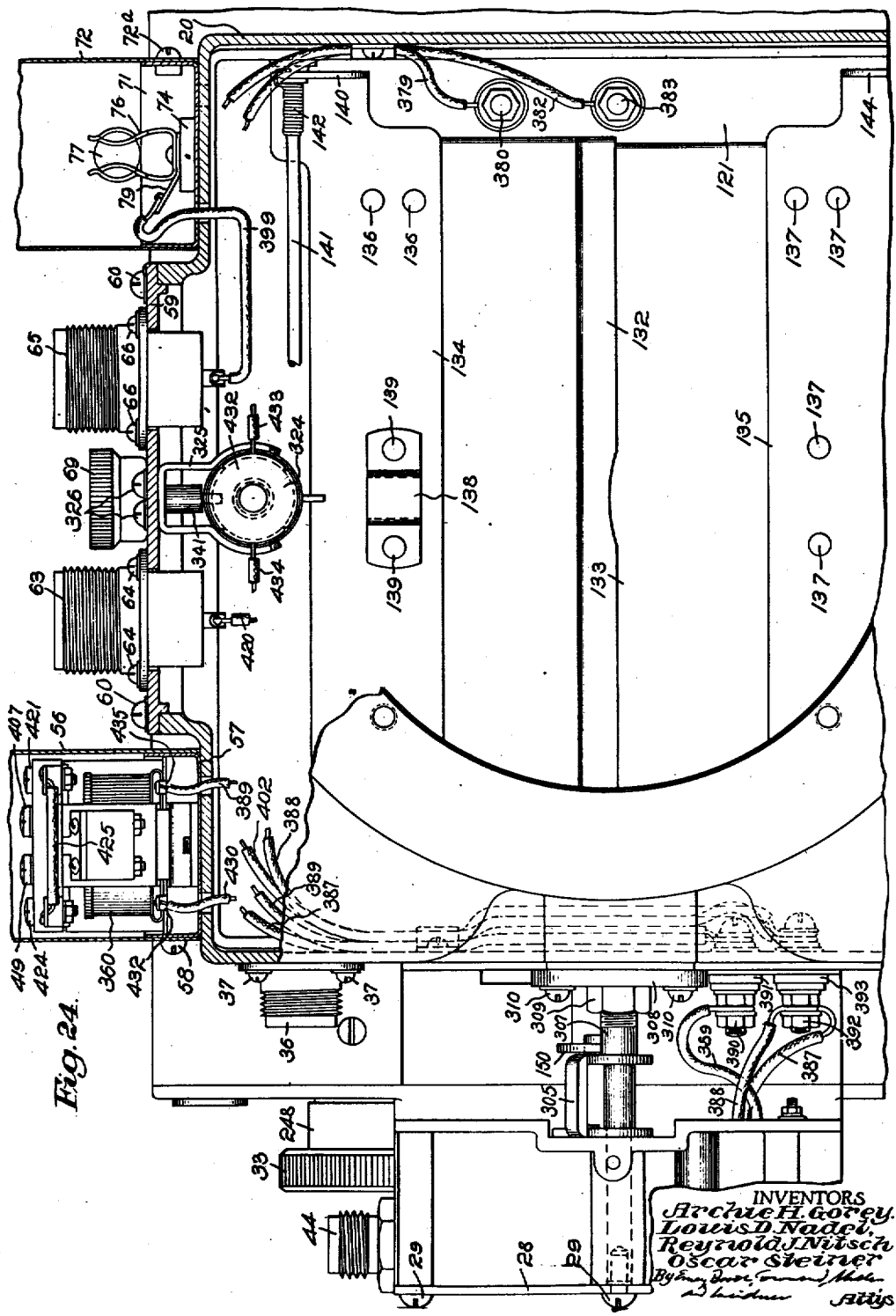

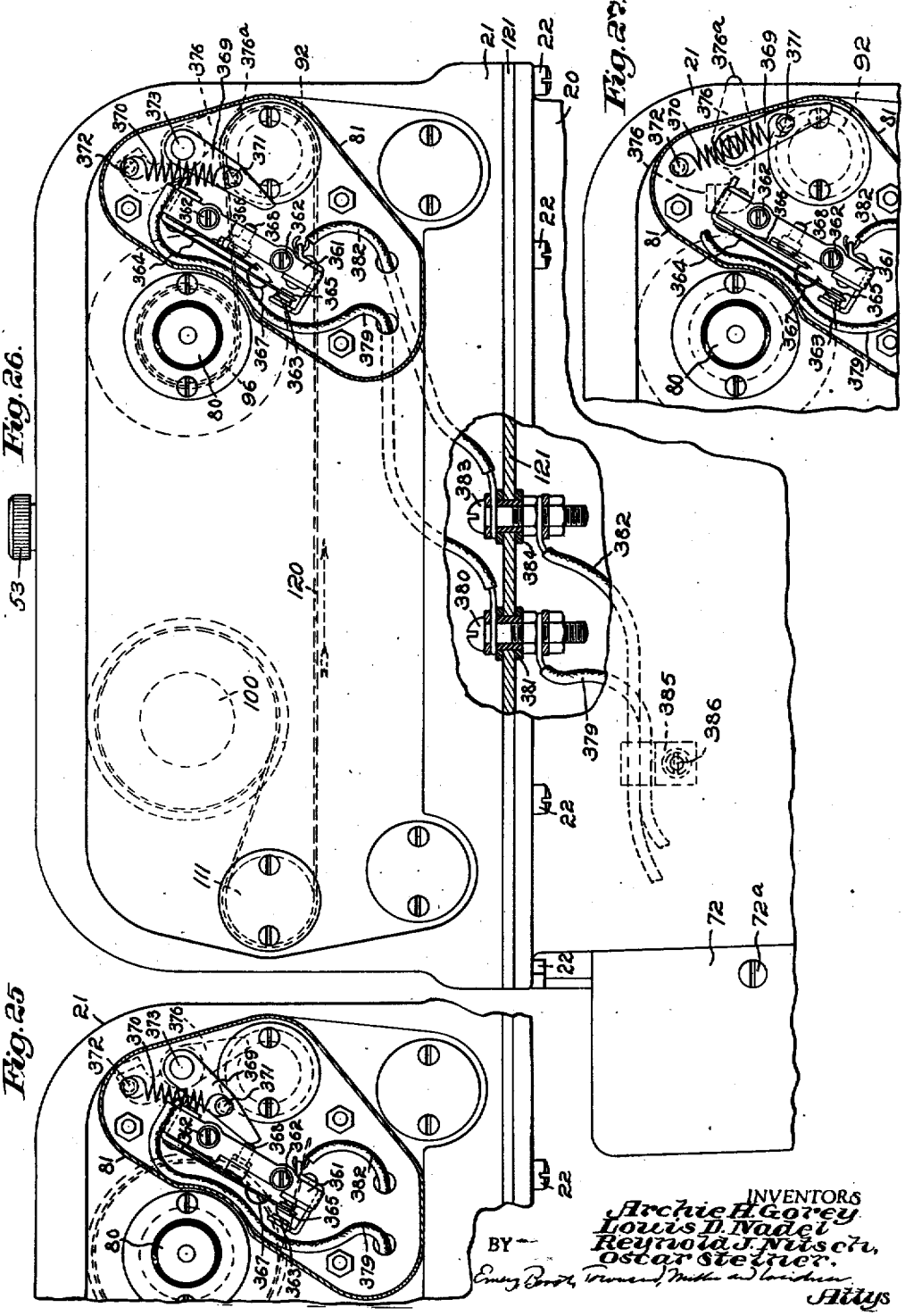

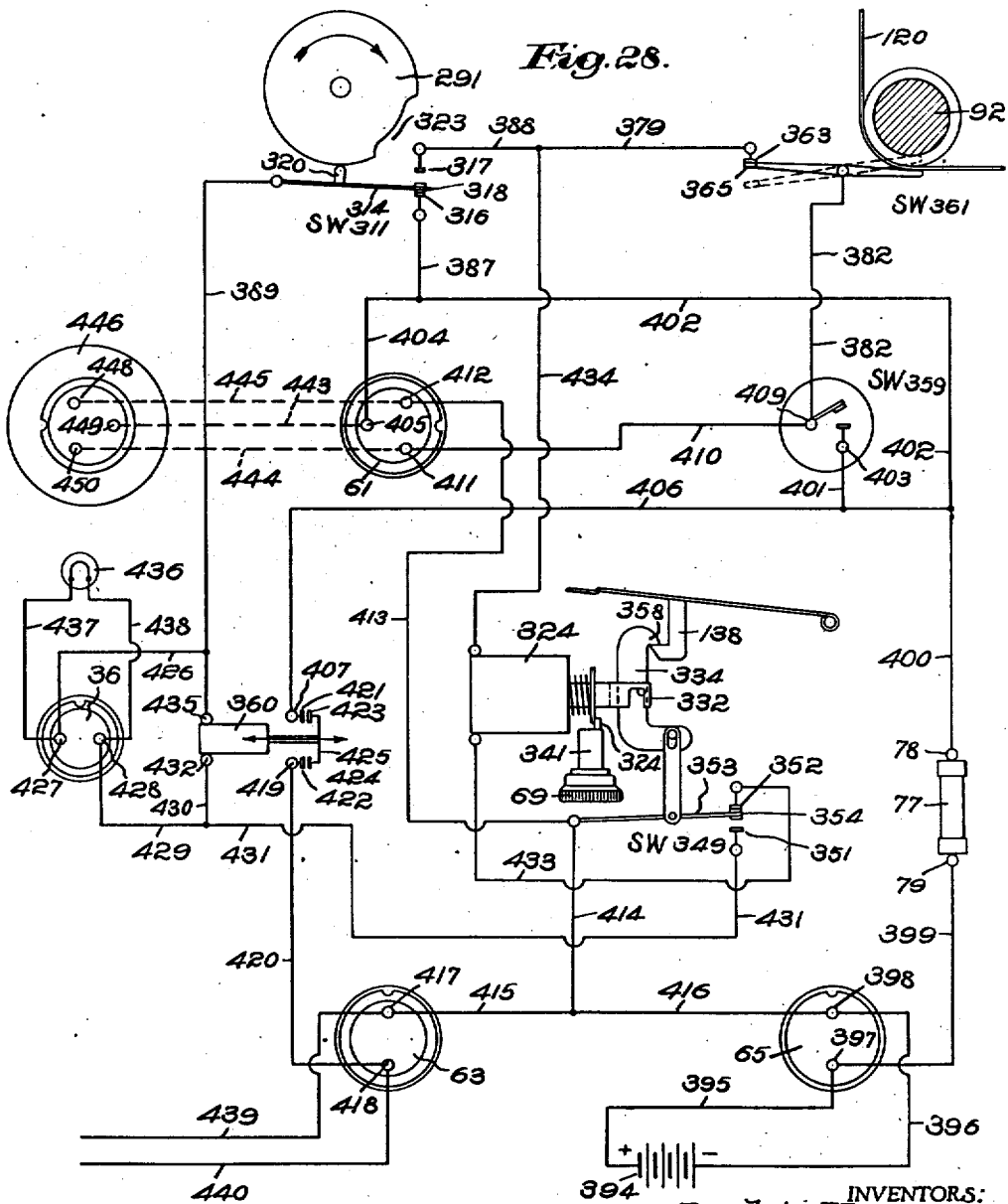

Patented Mar. 13, 1945

2,371,592

UNITED STATES PATENT OFFICE 2,371,592

AUTOMATIC AERIAL CAMERA

Archie H. Gorey, Louis D. Nadel, Reynold J. Nitsch, and Oscar Steiner, Rochester, N. Y., assignors to The Folmer Graflex Corporation, Rochester, N. Y., a corporation of Delaware Application February 19, 1943, Serial No. 476,456

35 Claims. (Cl. 95—12.5)

This invention relates to a fully automatic aerial camera, but is not as to all its features limited thereto.

In order that the principle of the invention may be readily understood, we have disclosed a single embodiment of the invention in the accompanying drawings, wherein—

Fig. 12 is an enlarged detail of the operating lever or link for the capping gates;

Fig. 13 is a partial section through the camera taken on the line 13—13, Fig. 14, showing the motor drive mechanism and its application to the camera drive mechanism;

Fig. 15 is a view similar to Fig. 14 but having additional parts broken away so as further to show the motor drive mechanism;

Fig. 16 is an enlarged detail of the capping gate release mechanism in its condition after the capping gates have been released;

Fig. 17 is a view similar to Fig. 16 but showing the capping gates held in open condition;

Fig. 18 is an enlarged isometric detail of a cylindrical plunger or armature of the gate latch solenoid;

Fig. 19 is an enlarged isometric detail of the capping gate latch;

Fig. 20 is a plan view of the shutter curtain showing the several apertures thereof;

Fig. 21 is a view of the back or inner side of the camera control plate, showing the relation of the several parts mounted thereon;

Fig. 22 is a vertical section through Fig. 21 on the line 22—22 thereof, showing the construction of the solenoid and the latching means, set for day photography;

Fig. 23 is a sectional view similar to Fig. 22, but showing one of the capping gates about to be engaged by the capping gate latch, the mechanism being now set for night photography;

Fig. 24 is a bottom view of the camera with certain parts broken away so as more clearly to show some of the operating mechanism, particularly the power relay, the electrical connecting receptacles, the capping gate latch solenoid, the fuse block and certain parts of the wiring;

Fig. 25 is a fragmentary detail of the right hand side of the camera magazine, showing the switch and operating means for controlling the camera when the film supply is exhausted, the switch being shown open and no film passing around the measuring roller;

Fig. 26 is a view of the right hand side of the camera magazine showing in dotted lines the film spools and idler roller, with the film passing from the supply spool around the left hand idler roller, right hand measuring roller and take-up spool, the control switch being in closed condition;

Fig. 27 is a detail similar to Fig. 25 but showing the film supply control mechanism in condition for threading a new supply of film; and Fig. 28 is a wiring diagram of the camera and auxiliary devices.

Figure 1:
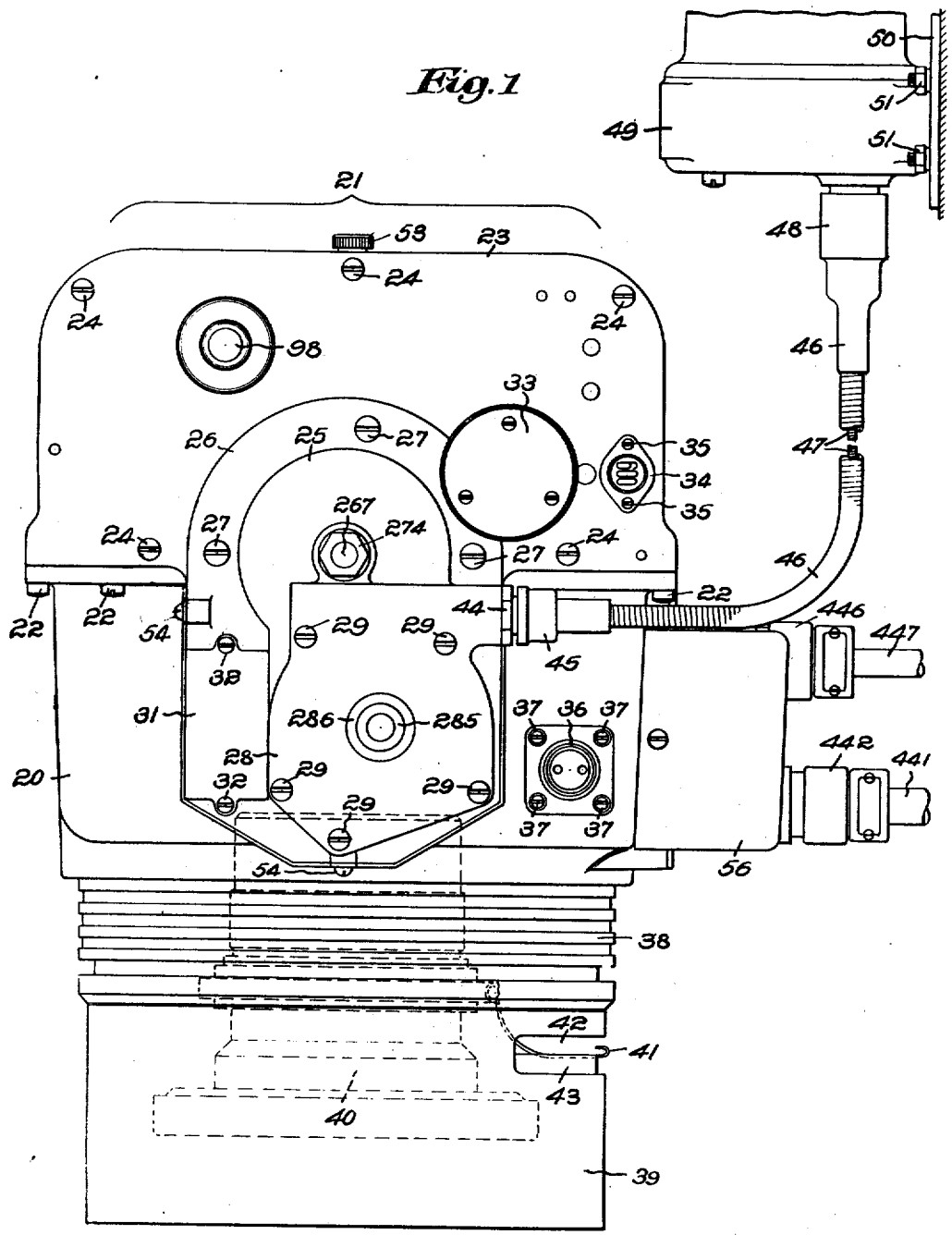
Fig. 1 is a right hand side elevation of the camera as mounted in an aeroplane and showing the driving motor partly broken away, the cable for connecting the mechanical power from the motor to the camera being also shown.

The camera herein disclosed is adapted for use as a daytime camera for making either vertical or oblique photographs, and it is also adapted for use in night photography when the ground area is illuminated by flash bombs. Some of the structural features of this camera are similar to the disclosure in the co-pending application Ser. No. 437,240, filed April 1, 1942, now Pat. No. 2,362,813, dated November 14, 1944, in the names of Archie H. Gorey, Louis D. Nadel and Edson S. Hineline, the said Gorey and Nadel being among the co-inventors of this invention. The above referred to invention disclosed in a co-pending application is for a hand camera, and the camera of the present invention, while it can be readily operated by hand, is primarily intended to be operated automatically by the use of an electric motor, and when so operated, it can be controlled in a number of different ways. That is to say, the camera herein disclosed can be operated (1) by the operator pressing a button on one of the camera walls, (2) remotely by closing an electrical circuit through the use of a push button switch, (3) by a mechanical timing device that sends out an electrical impulse, (4) by closing an electrical circuit at predetermined cycle times, (5) both by mechanical contact for the first half of the cycle, and (6) by an automatic device actuated from the light received from the flash bombs for the second half of the cycle. These several methods or manners of operation will be more fully disclosed at the proper time in the ensuing description.

One object of this invention is to provide a fully automatic camera that can be operated from any point in the aeroplane to which it is attached. Other objects of the invention are: to provide an automatic camera that can be quickly changed from a day camera to a night camera; to provide a camera that can readily be operated by hand in the event of power failure; to provide a cemera having signalling means to indicate to the operator that the camera is properly functioning; to provide a camera having automatic means for stopping the camera after the film supply has been exhausted; to provide automatic means to prevent the operation of the camera if for any reason there is no film in place; and to provide a camera of very rugged structure that can be used for any and all of the said methods or manners of operation, but which is wholly self-contained and readily adjusted for any of the several methods or manners of use. Without limiting our invention thereto nor to its use exclusively as an aerial camera, we will describe in detail the selected embodiment of our invention.

The aerial camera herein disclosed is, as hereinbefore stated, intended primarily to be operated automatically by an electric motor, but it can be readily operated by hand. Many of its general features are similar to and in some instances substantially identical with the construction shown in the said co-pending application of Gorey, Nadel and Hineline, Ser. No. 437,240, filed April 1, 1942. In order to avoid repeated references to that application, the disclosure in the present case is of the complete camera including such parts as are similar to or even identical with what is shown in said co-pending application.

Referring first to Fig. 1 wherein the camera is shown in outline in the position in which it is to be mounted in an aeroplane, the camera body is indicated at 20, and thereto the camera magazine 21 is attached by screws 22, 22, said magazine being provided with a mechanism cover indicated generally at 23 and held to the magazine by screws 24, 24. Attached to the said mechanism cover 23 is a motor-drive-unit mechanism, housing or box, indicated generally at 25 and having a flange-like formation 26, the said unit, housing or box being held to the mechanism cover 23 by screws 27, 27. A worm gear housing 28 is attached to the said motor drive unit 25 by screws 29, 29 and formed integral with the unit or housing 25 is a box-like structure 30 (best shown in Figs. 14 and 15) having a cover 31 (Fig. 1) attached thereto by screws 32, 32 threaded in suitable holes in the said box-like structure 30.

Projecting from the magazine cover 23 is a shutter reset knob 33, an escutcheon plate 34 being also attached to said cover 23 by means of screws 35, 35, and through said plate 34 the shutter speed indication is visible, as clearly evident from Fig. 1. A signal receptacle 36 is attached to the camera body 20 by screws 37, 37, and by suitable screws (not shown) a lens support 38 is attached to the lower face of the camera body, and to said lens support is attached a lens shade 39. A lens mount 40 with a suitable lens for aerial photography particularly, though not exclusively, is shown in said figure in dotted lines, and it is therein represented as provided with a diaphragm adjusting lever 41 that protrudes through an open slot 42 in said lens shade 39, being held in position by a lock plate 43 attached to the lens shade 39 by screws 43a, 43a (best shown in Fig. 2).

Also shown in Fig. 1 is a flexible shaft coupling 44 of suitable construction that is attached to the worm gear or motor drive housing and to said coupling 44 is fitted a suitable flexible shaft coupling 45, itself attached to a flexible shaft, tubular housing 46 through which passes a flexible drive shaft 47. The opposite end of the said flexible shaft, tubular housing 46 is provided with a second coupling 48 attached to an electric drive motor 49 supported on a wall of the aeroplane by means of a support plate 50 and screws 51, 51.

Figure 2:
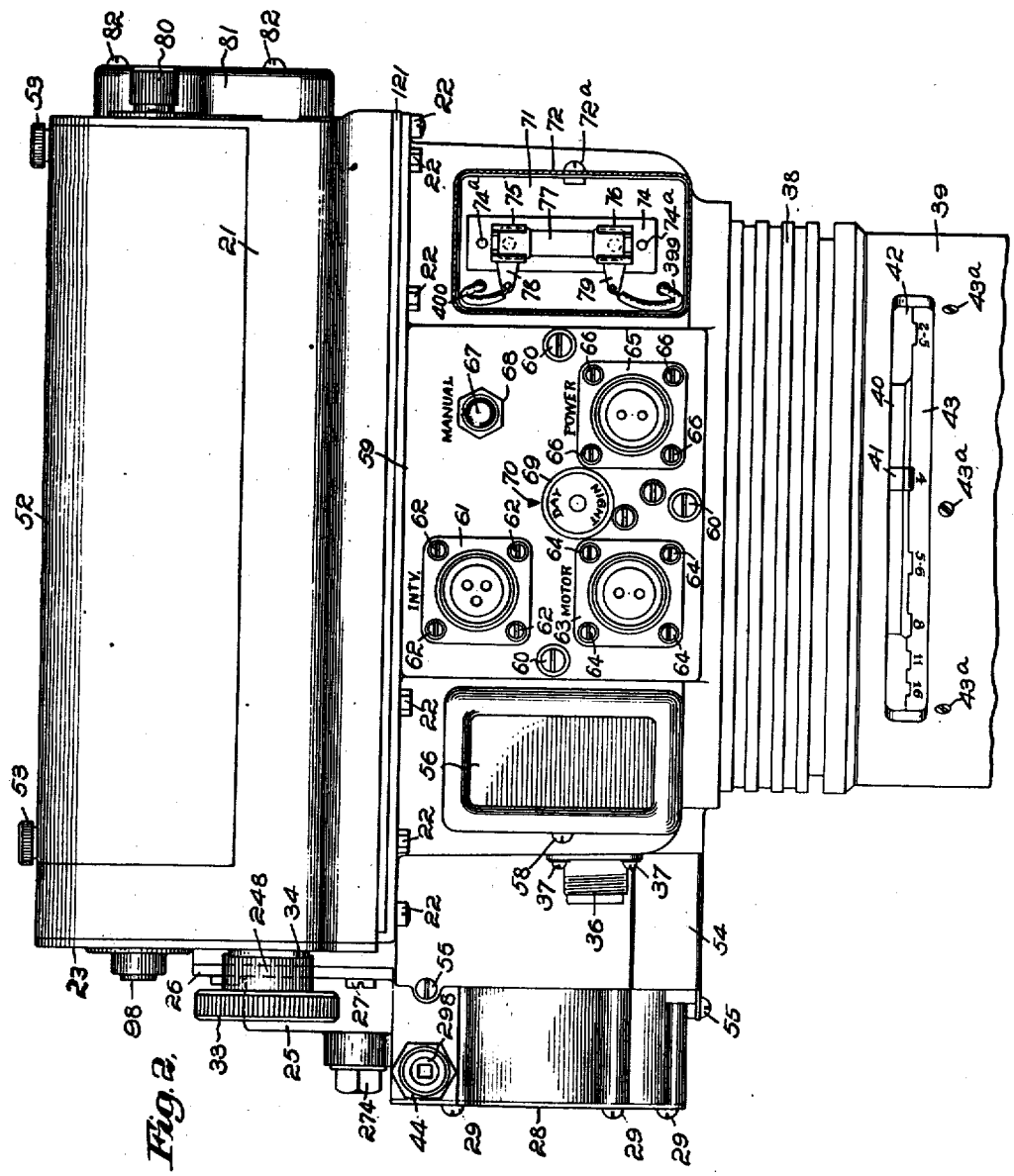
Fig. 2 is a front elevation of the camera with part of the lens shade broken away, and showing also the connecting receptacle for the electrical circuit to the intervalometer, the motor, the power supply and also the manual operating button and the knob for changing from day to night cycle, the cover over the fuse box being broken away to show more clearly the mounting thereof.

Reference is next made to Figs. 1, 2 and 24, and particularly to Fig. 2 wherein in front elevation is shown the camera magazine 21 and its removable cover 52 held to said magazine by thumb screws 53, 53. The space between the motor drive unit or housing 25 and the camera body 20 is closed by means of a U-shaped strap cover 54 that is held to the said motor drive unit by screws 55, 55. Attached to the front face of the camera body 20 (as more completely shown in Fig. 24) is a relay housing or cover 56 of a box-like shape having an inner member or relay bottom plate 57 securely attached to the camera body 20 in any suitable manner. The said relay housing or cover 56 is held to the inner member or bottom plate 57 by screws 58 shown in Fig. 2. The camera body 20 is provided in its side with an opening (best shown in section in Fig. 24) provided with a cover plate 59 held to the said camera body 20 by screws 60, 60. Atttached to said cover plate 59 is an intervalometer receptacle 61, shown in Fig. 2 as held thereby by screws 62, 62; a motor receptacle 63 held thereto by screws 64, 64; a power supply receptacle 65 held thereto by screws 66, 66; and a manual switch 67 held thereto by nuts 68 and 68a. Also attached to the said cover plate 59 is a day-and-night control knob 69, an index pointer 70 being provided on the said cover plate 59 to indicate the proper setting.

To the camera body 20 at the right of the cover plate 59 is attached an inner fuse box member 71 having a cover 72 held to the inner box member 71 by means of screws 72a, a fuse supporting member 74 being attached to said box member 71 by screws 74a, 74a. Said member 74 has fuse clips 75, 76 fitted into which is a fuse 77, the fuse clip 75 being provided with a connecting terminal 78 and the fuse clip 76 being provided with a connecting terminal 79.

To the right hand end of the said camera magazine 21 is fitted a spool support member head or knob 80 and a film supply switch cover 81 held to said magazine by means of screws 82, 82.

Figure 3:
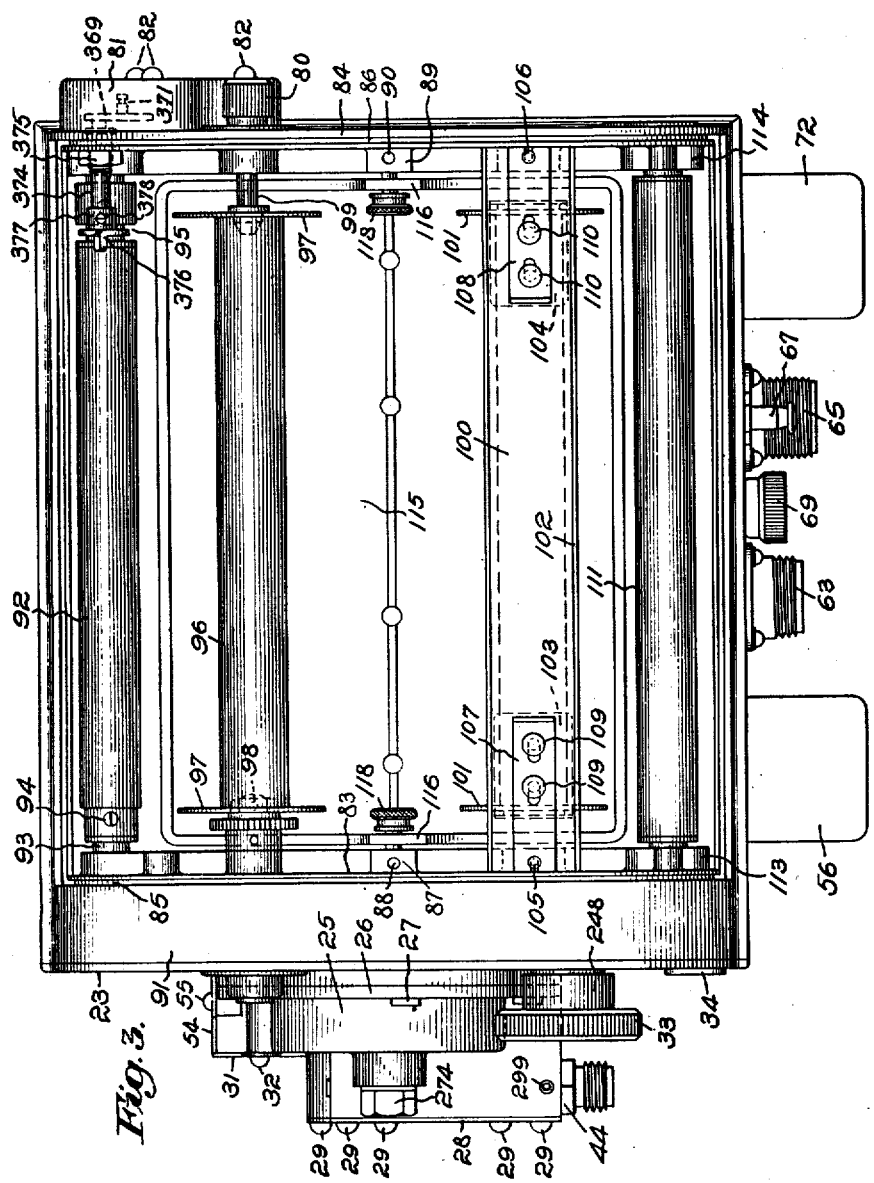
Fig. 3 is a top plan view of the camera with the film compartment cover removed, so as to show the relative positions of the film supply and take-up spools, the film idler roller, the film measuring roller and the pressure pad.

Reference is next made particularly to Fig. 3, wherein the camera body or casing is represented in top plan view with the magazine cover 52 removed. Therein the magazine is shown as provided with two end walls whereof the left end wall is indicated at 83 and the right hand end wall at 84, the wall 83 being provided with a groove 85 into which the magazine cover 52 is fitted, and the said right hand wall 84 having a groove 86 to receive said cover. The said end wall 83 is also provided with a boss 87 having a tapped hole 88 into which a cover screw 53 is threaded, and the end wall 84 is provided with a similar boss 89 having a tapped hole 90, into which a cover screw 53 is threaded. Extending outwardly from the said left hand wall 83 is a box-like compartment 91 carrying the shutter-operating and film-rewind mechanism that will be referred to in detail at a subsequent point.

Between the said end walls 83 and 84 there is fitted in suitable bearings a measuring roller 92 held to a shaft 93 by a set screw 94. The right hand end of the said measuring roller 92 is provided with a notched-out section or notch of a reduced diameter indicated at 95, the function whereof will be set forth when describing the film supply indicator. Fitted between the said end walls 83, 84 is a take-up spool 96 having the usual flanges 97, 97, the left hand end of said spool 96 being supported on a shaft 98, shown in Fig. 3 in dotted lines, and having the usual key-shaped formation for driving such spool. The opposite end of the said take-up spool 96 is carried by a spool support rod or shaft 99 passing through a hole in the end wall 84 and provided with the knob or head 80, previously referred to. The supply spool is indicated in dotted lines at 100 in Fig. 3, and also in section in Fig. 4. It is provided with flanges 101, 101 and is supported by a bracket 102 having attached thereto right-angled downwardly-extending spring members 103, 104, shown in dotted lines in Fig. 3 and in solid lines in Fig. 4. The said bracket 102 is attached to the said end walls 83, 84 by pins 105, 106 respectively through the engagement of lock plates 107, 108 carried on shoulder rivets 109, 109, 110, 110 securely attached to the bracket 102.

Figure 4:
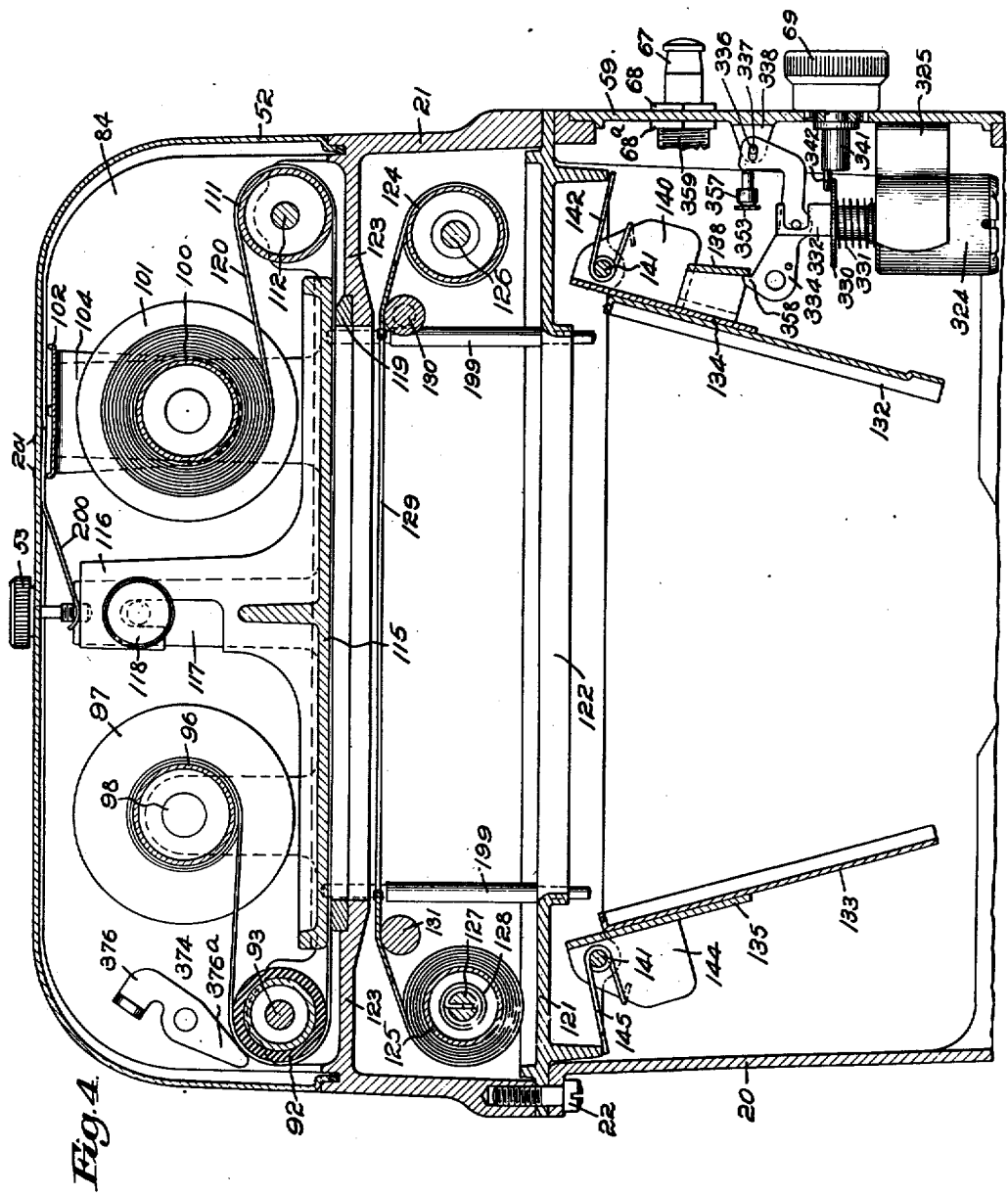
Fig. 4 is a vertical transverse section through the camera, showing the position of the film spools, the shutter curtain spools and shutter curtain rollers, the capping gates being shown held open as they are when the camera is used for night photography.

Referring particularly to Figs. 3 and 4, an idler roll 111 is supported by a through-shaft 112 fitted into bosses 113, 114 integral with said end walls 83, 84 respectively. In order to hold the film in a flat condition while photographs are being made, there is provided a pressure plate or pad 115 having upwardly extending arms 116, 116 provided with L-shaped slots or openings 117, best shown in Fig. 4 as engaged by shoulder screws 118, 118.

The camera magazine 21 is provided with an aperture plate 119 and the film 120 is held between the said pressure plate or pad 115 and the said aperture plate 119 during the time of the exposure of the film.

Fitted between the camera magazine 21 and the camera body 20 is a capping gate support plate 121 having a flange opening 122 (most clearly shown in Fig. 4), and between said support plate and an aperture-plate-supporting receiving ledge 123 are a shutter curtain rewind roll 124 and a shutter tension roll 125, both of usual construction, the said rewind roll 124 being provided with a drive shaft 126 and the tension roll 125 being provided with a tension spring support 127 and a tension spring 128. A shutter curtain 129 is wound upon the said shutter rewind curtain roll 124 before making an exposure and when released for making an exposure, it is wound upon the said tension roller 125 by said tension spring 128. In order to position the said shutter curtain 129 as close as possible to the focal plane, there are provided curtain idler rolls 130, 131 supported on suitable pivots provided in the magazine end walls 83, 84.

Reference being made particularly to Fig. 20, wherein, without in any way limiting the scope of the invention, there is shown a suitable shutter curtain. It is to be understood that such curtain is provided with at least two exposure apertures. Preferably, as shown in said figure, the shutter curtain 129, desirably of rubberized cloth, is presented as having two instantaneous exposure apertures 129a and 129b and a full exposure aperture 129c, the latter being used when making night or flash exposures. The instantaneous aperture 129a is used for the highest shutter speed which is the present embodiment of the invention is 1/600 of a second. The shutter aperture 129b is used for the lower instantaneous speed, which in the present instance is 1/300 of a second. Both of said apertures can be so proportioned that any desirable shutter speed can be obtained. The shutter curtain aperture 129c is, as stated, used when making night or flash photographs, to be described fully at a subsequent part of the specification. All the curtain apertures are provided with usual or suitable metal struts or reinforcing members.

Figure 5:
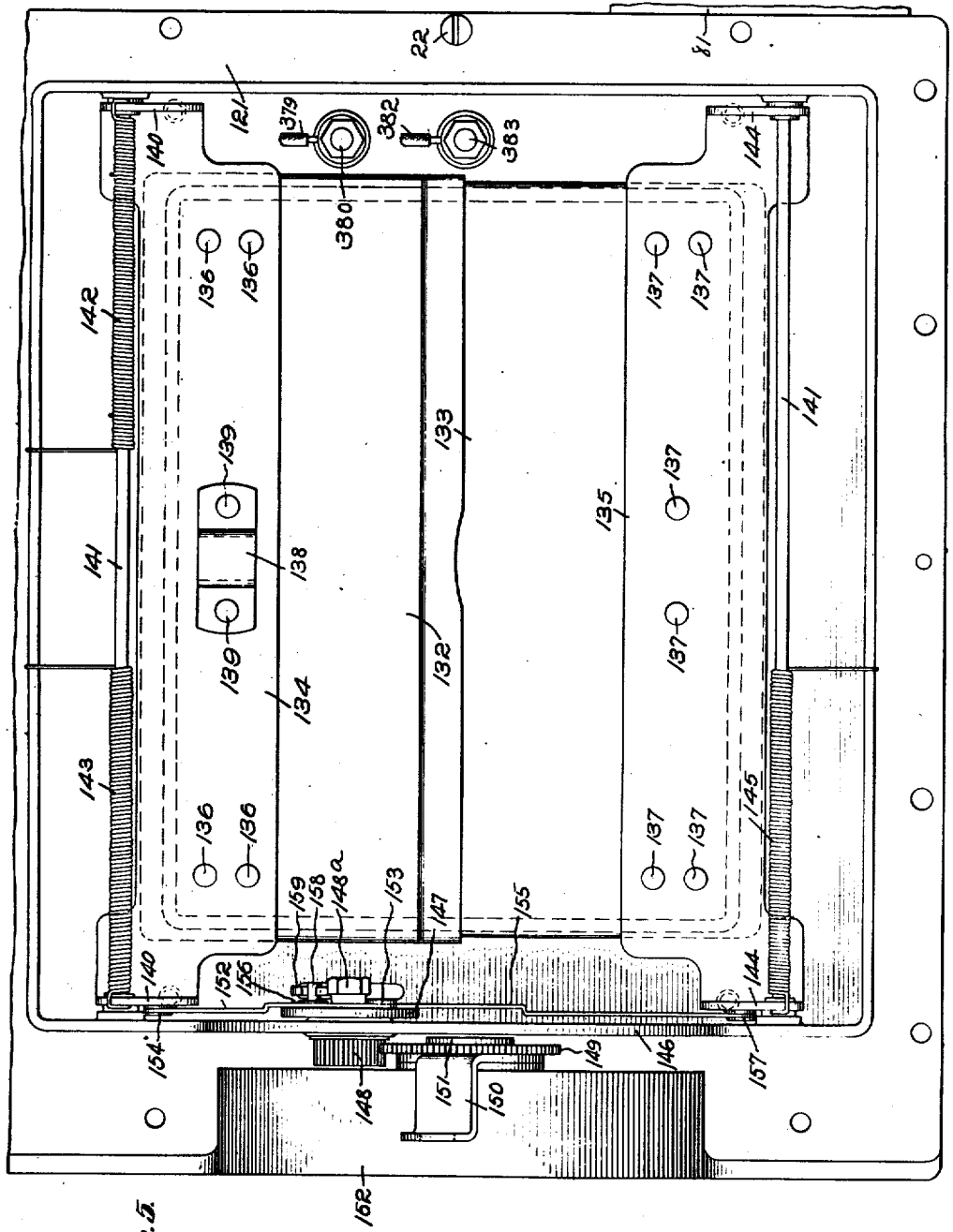
Fig. 5 is a bottom view of the camera with the lens cone removed to show more clearly the capping gates and the mechanism for operating them.

Referring particularly to Figs. 4 and 5 for the disclosure of the general structure of the capping gates, to the said capping gate support plate 121 are pivoted the right hand capping gate 132 and the left hand capping gate 133 having hinge members 134 and 135, the former being attached to the capping gate 132 by rivets 136, 136, and the latter being attached to capping gate 133 by rivets 137, 137. A latch plate 138, the function of which will be subsequently described, is also attached to the hinge member 134 by rivets 139, and said hinge member 134 is provided with two right angularly shaped members 140, 140 having suitable holes to receive a rod or shaft 141 passing therethrough and into holes provided for that purpose in the capping gate support plate 121.

Springs 142, 143 are shown in Fig. 5 as fitted over the said rod or shaft 141, one end of said spring 142 being hooked over the said member 140 of the hinge plate 134, the opposite end of said spring engaging the lower flange of the capping gate support plate 121, such spring acting to cause the capping gate 132 to be turned in a clockwise direction viewing Fig. 4. The said spring 143 is fitted in a like manner onto the opposite end of the said rod or shaft 141. The said hinge member 135 is provided with right angularly extending members 144, 144 and the said rod 141 has fitted thereover a spring 145, one end whereof is hooked over the right angled member 144 and the other end whereof is engaged by the lower flange of the capping gate support plate 121. The said spring 145 causes the capping gate 133 to be turned in a contraclockwise direction viewing Fig. 4.

Figure 6:
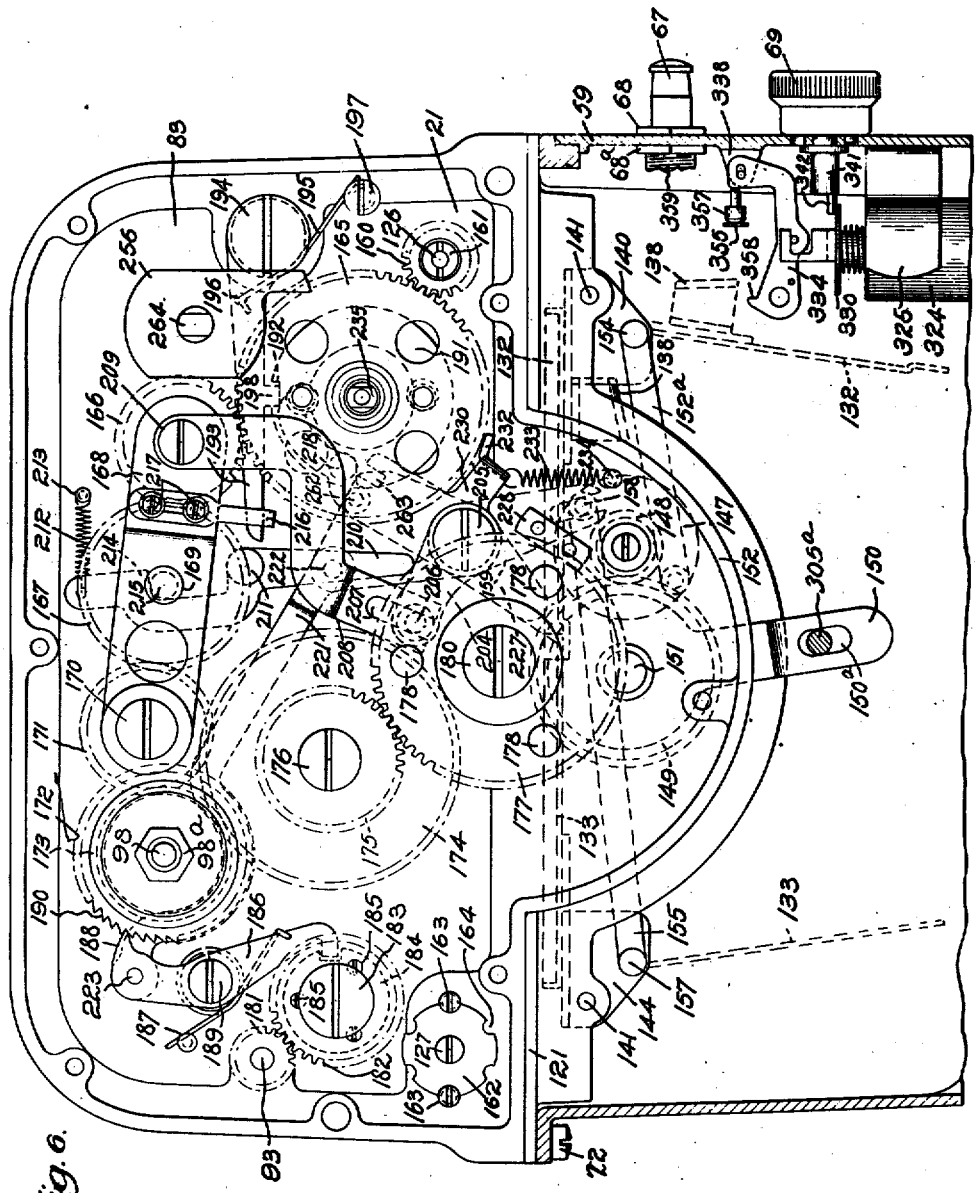
Fig. 6 is a left hand side elevation of the camera with the mechanism plate and motor drive removed so as more clearly to show the camera operating mechanism.

Both said capping gates 132, 133 are shown in the fully open position in Fig. 4 and in the closed position in Fig. 5, and it is noted that in Fig. 6 the said capping gates are shown in their closed horizontal position in dotted lines, and are also shown in dotted lines in their open position. The normal position for the said capping gates is the closed position shown in Fig. 5, and they are in the open position shown in Fig. 4 only during the time of making an exposure, as well as at certain times prior to making a night exposure, as will be more fully explained when describing the making of night or flash photographs.

Referring particularly to Figs. 5 and 6, to the left hand flange 146 of the capping gate support plate 121 is fitted a capping gate actuating disk 147 (best shown in Fig. 5), through which passes a shaft to the opposite end whereof is fitted and securely locked a pinion 148. The axial relation between said disk 147 and the said pinion 148 is adjustable through the act of loosening a nut 148a threaded onto the shaft of the said pinion and serving to clamp the said disk to a suitable shoulder (not shown) on said shaft. This adjustment constitutes means providing conveniently for an initial setting of the said pinion 148 with respect to the position of the capping gates 132, 133, during the act of assembling in manufacture, and after such initial adjustment has been made, no further adjustment is required.

Still referring to Figs. 5 and 6 and also to Figs. 12 and 13, there is provided in meshing relation with the pinion 148 a gear 149 having attached thereto a lever 150, said gear and lever being free to rotate on a shoulder rivet 151 itself riveted to the circular gear housing 152 of the camera magazine 21. The said disk 147 is connected to the hinge member 134 of the capping gate 132 by a connecting link member 152a (best shown in Fig. 6), one end of said link member being attached to the said disk 147 by shoulder rivet 153 (best shown in Fig. 13), the opposite end of the said link member 152a being connected to the said hinge member 134 of the capping gate 132 by a shoulder rivet 154 (best shown in Fig. 6 as riveted into the right angle extension 140 of the said hinge member 134). The said hinge member 135 is connected to the said disk 147 by a connecting member 155 (best shown in Fig. 6) and by a shoulder rivet 156, and is connected to the right angled member 144 by a shoulder rivet 157.

When the lever 150 is turned in a clockwise direction viewing Fig. 6, the disk 147 will be rotated in a contraclockwise direction, thereby causing the connecting link member 152a to be moved in a right hand direction, carrying with it the right angled member 140 of the hinge plate 134, thus causing the capping gate 132 to be turned in a contraclockwise direction viewing Fig. 6 (that is, into its open position), and the capping gate 133 will be caused to be turned in a clockwise direction (that is, into its open position) through the connecting link member 155. The shoulder rivet 156 is provided with a cylindrical extension 158 (shown in Figs. 6 and 12) that engages a shutter release lever 159 (shown in Figs. 5, 13 and 15) for releasing the shutter when the capping gates 132, 133 approach their full open position.

From the structure shown in Fig. 6, the mechanism cover plate 23 has been removed and one wall of the camera body 20 has been cut away in order to show more clearly the shutter mechanism and the film rewind mechanism. As therein shown, the shutter curtain take-up roll 124 having, as stated, its shaft 126 passing through the magazine end wall 83, is fitted with a pinion 160 held to said shaft 126 by a lock nut 161. The shutter curtain tension roller 125, provided, as stated, with the shaft 127 extending through the magazine end wall 83, has fitted thereto a lock plate 162 for the purpose of turning the said shaft and thereby tensioning the spring 128. When sufficient tension has been placed on said spring, screws 163, 163 are threaded into suitable holes in the said magazine outer wall 83 so as to engage notches 164 of the said lock plate 162.

The shutter curtain 129 is shown in the rundown condition in Fig. 4, this being the position of the shutter curtain when night exposures are being made, as will be described more fully at a subsequent point.

Referring now to Figs. 6, 7, 8 and 13, when the shutter curtain is rewound for making an instantaneous exposure, the pinion 160 is turned in a clockwise direction by means of a shutter rewind gear 165 that for such purpose is turned in a contraclockwise direction. In order to turn said pinion 160 in a clockwise direction for rewinding the shutter curtain, there is provided a train of gears, also serving for winding film onto the take-up spool for a subsequent exposure. Meshing with the said shutter rewind gear 165 is an idler gear 166 that meshes with a second idler gear 167, both of which idler gears are mounted on a gear rocker arm 168, the idler gear 166 being mounted on a shoulder stud 166a (best indicated in Fig. 13), the idler gear 166 being provided with a shoulder rivet indicated at 169. Threaded into the magazine end wall 83, as indicated in Fig. 6, is a shoulder screw 170, and pivoted thereon is the said gear-rocker arm 168 and also an idler gear 171.

Mounted on the take-up spool shaft 98 is a slip clutch drive (indicated generally at 172) having a gear 173 indicated in dotted lines in Fig. 6 as meshing with the idler gear 171 and also with an intermediate gear 174. The said gear 173 is of sufficient width to accommodate the faces of both gears 171 and 174, inasmuch as said latter gears are not in alignment but are so spaced that the gear 174 clears the gear 171.

Attached to the said intermediate gear 174 is a drive pinion 175, said gear and pinion being carried on a shoulder stud 176 threaded into the end wall 83 of the camera magazine. Meshing with the said drive pinion 175 is a main drive or master gear 177 having drive pins 178, 178. The said main drive gear 177 is mounted on a shoulder stud 179 fitted to the said magazine end wall 83 (most clearly shown in Fig. 13), the said main drive gear being held in place by a large head screw 180, and it is also provided, as shown in Fig. 13, with a hub 177a so as properly to space said main drive gear from the magazine end wall 83.

When the main drive or master gear 177 is turned in a contraclockwise direction viewing Figs. 4, 6 and 13, the gear train, consisting of the gears 177, 175, 174, 173, 171, 167, 166 and 165 and the pinion 160, will be caused to turn said pinion being turned in a clockwise direction so as to wind up on the curtain roller 124 the shutter curtain 129, and the shaft 98 will drive the spool 96 (best shown in Fig. 4) in a contraclockwise direction, thus winding up the film 120 on the spool 96. As the film is so wound on said spool 96 and also over and around the measuring roller 92, the shaft 93 will be caused to turn in a clockwise direction, turning with it the pinion 181 so as to cause an index gear 182 (best shown in Fig. 6) to be turned in a contraclockwise direction. Said index gear 182 is mounted on the magazine wall 83 by means of a shoulder screw 183. Attached to the index gear 182 is a cam plate shown in dotted lines at 184 in Fig. 6, being so attached by screws 185.

When the measuring roller 92 has turned a sufficient distance to cause a notch in the said cam plate 184 to be in the position shown in Fig. 6, the L-shaped end of a pawl arm 186 will drop into the said notch under the influence of a spring 187 carrying with it a pawl 188, the said pawl arm being mounted on the magazine end wall 83 by a shoulder screw 189. The said pawl 188 will now engage the teeth of a ratchet 190 of the said slip clutch 172, thus preventing further turning movement of the said take-up spool 96 and thereby stopping further movement of the film 120.

The slip clutch 172 (indicated in Fig. 6) may be of any suitable construction and is desirably of the structure shown in the said co-pending application of Gorey, Nadel and Hineline, Ser. No. 437,240. The requirements of such slip clutch will now be set forth, and reference will be made to the immediately co-acting parts. The shaft 98 drives the take-up spool 96 and integral with said shaft is the said ratchet 190. The gear 173 is mounted on the said shaft 98, but in such a manner that when a predetermined load just sufficient to wind film on the take-up spool 96 is put on said shaft 98, the said gear 173 will be allowed to turn even though said shaft 98 is held in a stationary condition. Therefore, when sufficient film has been measured off for an exposure, the L-shaped end of the pawl arm 186 engages the notch in the cam plate 184, and its pawl 188 will engage the teeth of the ratchet 190, thus preventing the take-up spool 96 from being turned, but allowing the gear 173 to continue turning so as to complete the winding of the shutter curtain. The diameter of the measuring roll 92 and the gear ratio between the pinion 181 and the index gear 182 is such that when the index gear 182 makes one complete revolution, a sufficient amount of film will have been fed to provide a new unexposed area of film in front of the exposure opening.

Figure 10:
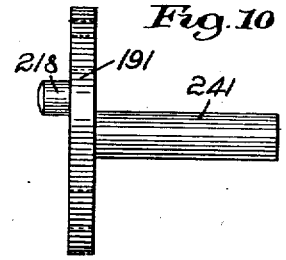
Fig. 10 is a detail of the shutter release cam plate.
Figure 11:
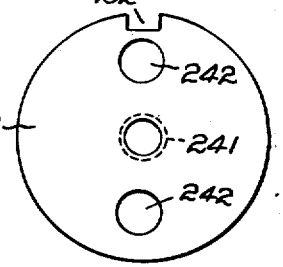
Fig. 11 is a left hand end view of Fig. 10.

As best shown in Figs. 10 and 11, but referring also to Figs. 4, 6 and 13, there is attached to the shutter curtain rewind gear 165 in a manner to be more fully described at a subsequent point, a shutter release cam plate 191 having a peripheral notch 192. To the magazine end wall 83 (best shown in Fig. 6) a shutter latch or release lever 193 is attached by means of a shoulder screw 194, it being caused to rotate in a contraclockwise direction about the screw 194 by a spring 195, one end whereof is hooked in a hole 196 of the lever 193 and the opposite end whereof is engaged by pin 197. The said latch or release lever 193 is provided with a downwardly extending dog 198 for engaging the peripheral notch 192 of the shutter-release cam plate 191.

In Fig. 6, the mechanism is shown in condition for making an exposure, at which time the shutter curtain has been rewound, so that the previously selected aperture will be in position for exposure, and a new area of sensitized film will be in position before the exposure opening. The capping gates 132, 133 will be in the horizontal position shown in the upper dotted lines in Fig. 6 (that is, in their closed position), and the pressure plate or pad 115 will be raised vertically from the film 120 (most clearly shown in Fig. 13). The said pressure plate or pad 115 is for that purpose positioned on four pressure plate or pad raising pins 199 that pass through suitable holes of the inner wall 123 of the camera magazine and also through suitable holes in the capping gate support plate 121 (clearly shown in Fig. 4).

When the capping gates 132, 133 are in the open position (shown in the lower dotted lines in Fig. 6), the pins 199 are caused to be moved downwardly by the pressure plate or pad 115 through the action of plate springs 200, one of which is shown in Fig. 4 as pressing on the vertical members 116, 116 of the pressure plate or pad 115. As indicated in Fig. 4, each spring 200 is riveted to the magazine cover 52 by rivets 201, 201. When the capping gates 132, 133 are closed (as indicated in the upper or horizontal dotted lines in Fig. 6 and in section in Fig. 13) the rods 199 are moved in an upward direction under the influence of the hinge members 134, 135, thus raising the pressure plate or pad 115 to the position indicated in Fig. 6.

When the lever 150 (shown in Figs. 6 and 13) is caused to be rotated in a clockwise direction viewing Fig. 6, thereby opening the capping gates 132, 133 prior to making an exposure, as shown in the lower dotted line position, Fig. 6, the said pressure plate or pad 115 will be moved downwardly by means of the springs 200 and will then securely hold the film 120 in contact with the exposure aperture plate 119, Fig. 4, thereby clamping the film 120 between the said pressure plate or pad 115 and the said aperture plate 119. Said film will be held in such clamped condition as long as the lever 150 is held in the left hand position viewing Fig. 6, that being the position for making an exposure. When the said lever 150 is released or allowed to turn in a contraclockwise direction viewing Fig. 6, thus closing the capping gates 132, 133, the pressure plate or pad 115 will be removed from contact with the film 120, thereby preventing any scratching or injury thereof during film winding prior to a second exposure.

In order to cause an exposure to be made, the following action takes place, reference being made particularly to Fig. 6 and also to Figs. 12, 13 and 15, it being understood that the action in this respect is similar to that disclosed in the said co-pending application of Gorey, Nadel and Hineline, excepting for the means herein disclosed for turning the lever 150 which is provided instead of the lever or trigger 40, shown in said co-pending application. The said lever 150 is caused to be turned in a clockwise direction viewing Fig. 6. This is actually done by the motor drive mechanism to be hereinafter fully described, and already referred to in the description of Fig. 1, but for simplification of the description at this point, it may be assumed that the said lever 150 is moved manually. When so moved in a clockwise direction viewing Fig. 6, the gear 149 is also turned in a clockwise direction and pinion 148 is turned in a contraclockwise direction, turning with it the disk 147. Inasmuch as the shutter gate connecting links 152, 155 are connected to the said disk 147, the capping gates 132, 133 will be swung open into the lower dotted line position shown in Fig. 6. The pressure plate or pad 115 is thus allowed to move into contact with the film 120 and the pin 158 (shown in Fig. 12 and shown in Figs. 6 and 13 as in a slot of the lever 159) will be turned in a contraclockwise direction, causing the shutter release lever 159 (shown in Figs. 5, 6 and 13) to be swung in a clockwise direction.

The said lever 159 is attached to a shaft 202 (most clearly shown in Fig. 13) that passes through a bushing 203 of the magazine end wall 83. To the right hand end of said shaft 202, viewing Figs. 13 and 15, a lever 204 is attached by means of a lock screw 205, such lever carrying a shoulder rivet 206 (shown in Figs. 6 and 13) engaging a slot 207 of the gear releasing link 208 (best shown in Figs. 6 and 15), which is attached to the rocker arm 168 by a shoulder screw 209. As the said lever 204 is rotated in a clockwise direction, viewing said figures, the shoulder rivet 206 moves upward in said slot 207 and the upper face of said lever 204 engages the lower end of a locking lever 210 (shown in Fig. 6) pivoted on a shoulder screw 211, thus causing said locking lever 210 to be turned in a contraclockwise direction, thereby tensioning a spring 212, one end whereof is hooked in a suitable hole in the locking lever 210 and the opposite end whereof is hooked to a pin 213 on a stationary part of the camera. The said locking lever 210 is provided with a hooked formation 214 for engaging a cylinder extension 215 of the shoulder rivet 169.

The purpose of the locking lever 210 is to hold the idler gear 166 in mesh with the shutter rewind gear 165 when the shutter curtain is rewound, but as the lever 204 is rotated in a clockwise direction viewing Figs. 6 and 15, thus causing the rocking lever 210 to be turned in a contraclockwise direction, the hook member 214 will be disengaged from the cylindrical extension 215 of the pin 169 (shown in Fig. 6), and as the said shoulder rivet 206 of the lever 204 reaches the bottom of the slot 207, the rocker arm 168, Fig. 6, will be caused to move in an upward direction to disengage the idler gear 166 from the shutter rewind gear 165.

Further movement of the said lever 204 through the operation of the lever 150 (Fig. 6) will cause the shutter latch or release lever 193 to be turned in a clockwise direction by reason of a shutter release link 216 (Fig. 6) that is attached to the rocker arm 168 by a screws 217 thus withdrawing the dog 198 from the notch 192 of the shutter release cam plate 191 (Fig. 11). The shutter curtain will now be allowed to run down, thereby making an exposure.

When the lever 150 is caused to be moved in a contraclockwise direction viewing Fig. 6 under the influence of springs 142, 143 and 145 of the capping gates 132, 133, the lever 204 will be returned to the position shown in Fig. 6. The idler gear 166 carried on the gear-rocker arm 168 will be allowed to move in a downward direction so as again to engage the shutter rewind gear 165 and allow the shutter latch or release lever 193 to drop onto the shutter release cam plate 191 (Fig. 6), the locking lever 210 being caused to move in a clockwise direction, thereby allowing the hooked member 214 again to engage the cylindrical extension 215 of the shoulder rivet 169. The camera will then be in condition for the rewinding of the shutter and the feeding of a new area of film before the exposure opening.

Figure 9:
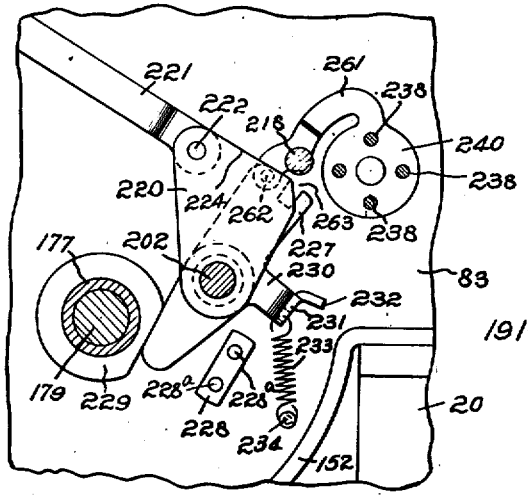
Fig. 9 is a fragmentary view of part of the interlock mechanism.

Referring now particularly to Figs. 6 and 9, as the shutter curtain runs down and, in doing so, turns pinion 160 on the shaft of the curtain take-up roll in a contraclockwise direction and also turns the shutter rewind gear 165 in a clockwise direction, a pin 218 carried by the shutter release cam plate 191 (Figs. 9 and 10) will have turned with the shutter rewind gear 165 until said pin 218 contacts with a bell crank lever 220 (shown in detail in Fig. 9 and shown in dotted lines in Fig. 6). The said bell crank lever will be caused to move in a contraclockwise direction on shaft 202 (Figs. 9 and 13), carrying with it a film-feed dog-connecting-link 221 that is attached (as shown in Figs. 6, 9 and 13) to the said bell crank 220 by means of a shoulder rivet 222. The opposite end of the said connecting link 221 is attached to the pawl arm 186 (as shown in Fig. 6) by means of a shoulder rivet 223. The pawl 188 will now be disengaged from the ratchet teeth 190 of the clutch 172 and the L-shaped end of the pawl arm 186 will be disengaged from the notch in the cam plate 184.

When the main drive gear 177 is now turned in a contraclockwise direction for rewinding the shutter curtain and feeding and winding sensitized material, the shaft 98 (Figs. 1 and 4) will be free to rotate, and film is accordingly wound up on the take-up spool 96, causing the measuring roller 92 to be turned, also turning the shaft 93, pinion 181 and gear 182, thus moving the notch in the cam plate 184 away from the L-shaped end of the lever 186. As the main drive gear 177 continues to turn, the shutter rewind gear 165 will also be turned, carrying with it the pin 218 (Figs. 6 and 9) in a contraclockwise direction and away from the bell crank 220 (Fig. 9), allowing the pawl arm 186 to be turned in a clockwise direction, but it will be withheld from turning sufficiently far to allow the pawl 188 to engage teeth 190, because the notch in the cam plate 184 will have moved out of a position in which it could be engaged by the L-shaped end of the pawl lever 186, and it will be held in such disengaged position until a sufficient amount of film has been wound to provide an unexposed area for a new exposure. The cam plate 184 (Fig. 6) will then have made a complete revolution, and the L-shaped end of the pawl 186 will again engage the notch in the cam plate 184, and the pawl 188 will engage the ratchet teeth 190.

Referring to Fig. 6, the shutter rewind gear 165 will continue to rotate until the notch 192 in the cam plate 191 is engaged by the pawl 198 of the shutter latch lever 193. The shutter will now be fully rewound and an unexposed area of the film will be in position.

The shutter rewind gear 165 will be stopped from further turning in a contraclockwise direction by the pin 218 (Fig. 9) engaging a flat surface 224 of the bell crank 220. The rocker arm 168 is caused to be turned in a clockwise direction for engaging the teeth of the gear 166 with the teeth of the shutter rewind gear 165 by means of a spring (not shown), but one end of which is hooked to a pin 225 that is an extension of a shoulder rivet 226 that carries the gear 166, and which spring is also connected to a second pin threaded through the magazine end wall 83, but not shown.

Referring to Figs. 6 to 9, when the shutter curtain is released and runs down, turning pinion 160 and the shutter rewind gear 165, carrying with it the pin 218, the said shutter rewind gear is stopped from further motion by a rocker arm 227 (shown in full lines in Fig. 9 and in dotted lines in Fig. 6). The said rocker arm 227 is carried on the shaft 202 and is free to rotate within the confines of the stop plate 228 and the hub or boss 229 of the stud 179. The said rocker arm 227 is provided with a laterally extending arm 230 having an upturned extension 231 with a right angled prolongation 232 therefrom. Hooked into a hole provided therefor in the said upturned extension 231 is a spring 233 hooked over a pin 234 on the camera casing, causing the said rocker arm 227 to be turned in a clockwise direction until stopped by the hub or boss 229.

Still referring to Figs. 6 to 9, as the shutter curtain runs down, the shutter rewind gear 165 turns in a clockwise direction, carrying with it the pin 218 until said pin contacts with the rocker arm 227 and causes said rocker arm to turn in a contraclockwise direction until stopped by the stop plate 228 and at the same time the bell crank 220 will be operated as previously described. The prolongation 232 of the upturned extension 231 is provided to prevent the changing of shutter speeds except at the proper time, and such functioning is set forth more fully in connection with the following explanation of the means for effecting change of shutter speed.

Figure 7:
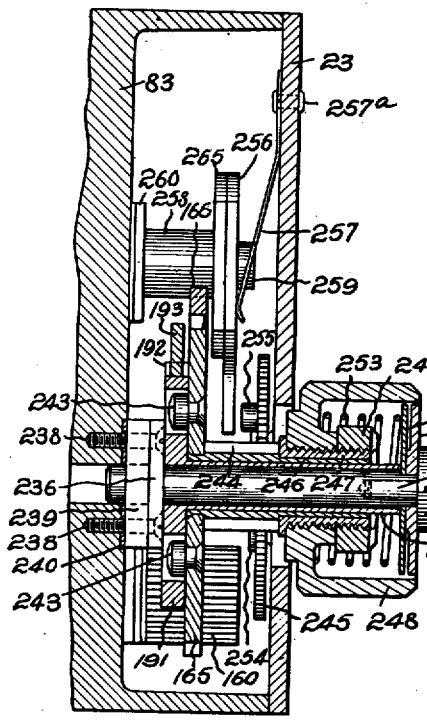
Fig. 7 is a vertical section through the shutter curtain rewind mechanism.
Figure 8:
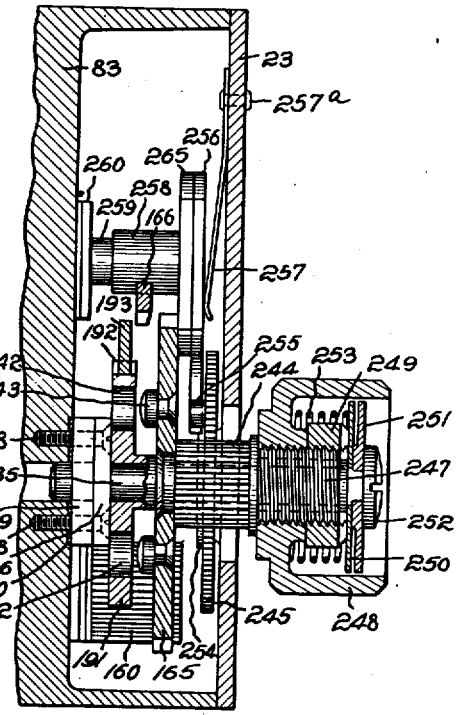
Fig. 8 is a view similar to Fig. 7 but showing the mechanism positioned for changing the curtain exposure aperture.

Referring now to Figs. 7 to 11, therein is shown the shutter rewind and setting mechanism, which is substantially the same in structural details as is shown in the said co-pending application of Gorey, Nadel and Hineline. In Fig. 7 the mechanism is shown in the normal condition (that is to say, in condition for making an exposure). In Fig. 8 the shutter rewind gear 165 is shown as having been disengaged from the shutter cam plate 191 for the purpose of changing the curtain position.

Referring now particularly to Fig. 7, but also to Figs. 8 to 11, on the magazine end wall 83 a shoulder stud 235 having a flange 236 is mounted by means of screws 238, and under said flange 236 is a spacing washer 239 under which is a spring interlock member 240 (best shown in Fig. 9). Riding on the said stud 235 and free to turn thereon is the shutter release cam plate 191 having an extending sleeve 241 (best shown in Figs. 10 and 11). The shutter release cam plate 191 is provided with two holes 242, 242 engaged by pins 243, 243 fitted to the shutter rewind gear 165, as shown in Figs. 7 and 8. When the mechanism is in the condition shown in Fig. 7, the cam plate 191 and the shutter rewind gear 165 will be locked together and rotate together.

Referring to Figs. 7 and 8, to the shutter rewind gear 165 is fitted a wide pin'on 244 (best shown in Fig. 8) that meshes with a countergear or shutter speed indicating gear 245. The said pinion 244 is fitted over the sleeve 241 (Fig. 7) and has a reduced diameter on its other end indicated at 246, and fitted thereover is a threaded sleeve 247, threaded onto which is a shutter setting knob 248 secured in place by a lock nut 249. To the end of said shaft 235 is fitted a spring retaining plate 250, and thereover is fitted a backing plate 251, said plate being locked to the shaft 235 by a lock screw 252. A coiled spring 253 causes the shutter setting knob 248, the pinion 244 and the shutter rewind gear 165 to be moved to the left against the shutter release cam plate 191, and the holes 242 of the cam plate 191 are engaged by the pins 243 of the shutter rewind gear 165, and when in this condition the said shutter release cam plate 191, the shutter rewind gear 165 and the shutter setting knob 248 all rotate together on the shaft 235.

Referring particularly to Fig. 8, by moving the shutter release knob 248 in a right hand direction to the position shown in said figure, the pins 243 are disengaged from the holes 242 in the shutter release cam plate 191, thus allowing the shutter rewind gear 165 to be rotated in either direction depending on whether the operator wishes to move the curtain to a higher speed or to a lower speed. The pinion 160 is of sufficient width to maintain engagement with the shutter rewind gear 165 at all times, and therefore when the shutter setting knob 248 is turned the pinion 160 will also be turned.

One revolution of the shutter rewind gear 165 and the shutter setting knob 248 turns the pinion 160 and the curtain take-up roller 124 sufficiently to move the shutter curtain just the right distance to bring into position a different curtain aperture for a subsequent exposure. That is to say, if the shutter curtain were previously set in a position to have the exposure slot for 1/300 of a second aligned for making an exposure, one complete turn of the shutter setting knob 248 in a contraclockwise direction would bring the shutter curtain in position for a 1/600 of a second exposure. If the shutter curtain had been set in position for a 1/600 of a second exposure, then two full turns of the shutter setting knob 248 in a clockwise direction would so move the shutter curtain that the full open curtain aperture would be in position to move before the shutter exposure opening, when the shutter was released. This provides ready means of selecting any particular shutter aperture.

Referring to Figs. 1, 7 and 8, in order to prevent changing of the shutter aperture when the shutter curtain is run down, and also to prevent the winding of the shutter curtain too far on the take-up roller 124 so as to cause injury to the shutter curtain, there are provided certain interlocks, and in order to determine what position the shutter curtain is actually in, there is prov'ded the shutter speed indicating gear 245 (previously referred to) which is attached to the mechanism cover 23 by means of a large head screw 254, said gear meshing with pinion 244. The shutter speed indicating gear 245 is marked with the various shutter speeds such as 1/300, 1/600 and full aperture, and this marking can be viewed through the window 34, as previously stated, when the shutter curtain is wound for making an exposure.

Referring particularly to Fig. 6, the shutter speed indicating gear 245 is provided with a stop pin 255 engaged by an interlock plate 256, when the shutter setting knob 248 is moved to the right under the influence of the shutter rewind gear 165 and against the tension of a spring 257 attached to the mechanism cover 23 by rivets 257a. The said interlock plate 256 is provided w'th a hub 258 which has a sliding fit over a stud 259 attached to the magazine end wall 83 by a flange 260 and suitable screws (not shown). When the shutter setting knob 248 is turned to the right to change the position of the shutter curtain, the shutter speed indicating gear 245 (Figs. 7 and 8) can be turned only in a clockw'se direction until it is stopped by the interlock plate 256, or it can be turned in a contraclockwise direction until it is stopped by the other side of the interlock plate 256. Thus the shutter curtain take-up roll 124 can only be moved to a distance sufficiently far to bring into position the several exposure apertures, and no further.

Referring particularly to Figs. 8 and 9, in order to prevent changing the shutter curtain position when the shutter curtain is in its run-down condition, there is provided an interlock made up of the said spring interlock member 240 that has a spring arm 261 to which is attached a pin 262. The said spring arm 261 is acted on by the pin 218 of the shutter release cam plate 191 when the shutter is fully wound, thus withdrawing said pin 262 from a notch 263 in the lever 227. The spring 233 will then cause the rocker arm 227 to be moved in a clockwise direction, thus removing the right angled member 232 of the upturned arm 231 from the face of the shutter rewind gear 165, which gear can now be moved in the right hand direction viewing Fig. 8 for changing curtain aperatures. When the shutter curtain is run down, the pin 218 will have caused the rocker arm 227 to be rotated in a contraclockwise direction, and the notch 263 to be engaged by the pin 262 of the spring arm 261, thus holding the rocker arm 227 in such position that the prolongation 232 of the upturned extension 231 of the rocker arm 227 will overlie the shutter rewind gear 165 and thus prevent it from being moved in a right hand direction and so change the relation of the shutter curtain with respect to the shutter release cam plate 191. The said interlock member 256 is prevented from rotating on the shaft 259 by reason of a keyway 264 (shown in Fig. 6) in the shaft 259 engaging a suitable key in a plate 265 provided for that purpose and riveted to the interlock member 256.

Making reference to Figs. 1, 12 to 15, it is to be understood that the foregoing description of the operation of the camera mechanism assumed that the main drive gear or master gear 177 is operated manually, but the present invention includes and is in part particularly directed to the provision as a novel feature of a drive mechanism providing automatic operation, which in the disclosed embodiment of the invention is made up of a gear box or housing constituting the motor drive unit previously referred to and generally indicated at 25 in Figs. 1, etc., to be referred to as drive mechanism, and also includes the electric motor indicated at 49 in Fig. 1, and the cable 46, 47, 48 to transmit power from the said electric motor 49 to the motor drive unit, gear box or mechanism housing 25. The camera is also constructed for automatic operation and is provided with an electrical circuit including a number of switches and is also provided with means for remotely controlling the camera with respect to the several different types of operating cycles.

Referring particularly to Figs. 12 to 15, wherein is shown in great detail the structure of the power drive mechanism, and particularly referring first to Fig. 13, there is mounted on the motor drive unit, gear box or housing 25 a large shouldered stud 266 having an enlarged diameter 267 and a head 268, and mounted on said enlarged diameter 267 is a drive plate 269 having a hub 270. The said drive plate has a series of peripheral notches 271 (shown in dotted lines, Fig. 14), which are engaged by the pins 178 (Figs. 13 and 14) of the said main drive or master gear 177.

Attached to the hub 270 by a coining operation is an interrupted gear 272, the construction of which is best shown in Fig. 15, wherein three of the teeth on each side of the gear (that is, opposite each other) are cut away to fit the interrupted face of a second interrupted gear 273 which has teeth provided on only one half of its periphery, the balance of the periphery being cut down on a true radius to the pitch line of the gear. Such a structure of interrupted gearing for providing intermittent motion is per se well known in the art and hence need not be more particularly described, but the application thereof to its present purpose is wholly novel.

The shouldered screw stud 266 is held to the motor drive unit, gear box or housing 25 by a lock nut 274 and a locking washer 275. The hub 270 and the interrupted gear 272 are free to turn on the enlarged diameter 267 of the shoulder screw stud 266 and the said gear 272 is driven intermittently by the second interrupted gear 273 which is connected to a hub 276 by three through-pins 277, one of which is shown in Fig. 13, one end of each of said pins being riveted to a driving ratchet member 278. The other end passes through a hole in the interrupted gear 273 and such gear is held to the hub 276 by a screw 279 (Fig. 13). The hub 276 rides in a housing 280 fitted into the inner wall 281 of the motor drive unit housing or gear box 25.

A worm gear 282 (shown in side elevation in Fig. 14) is free to rotate on the hub 276 between the ratchet member 278 and a thrust washer 283, said ratchet member being held to the hub 276 by screws 284. Said hub 276 is provided with a reduced diameter extension or hub portion 285 free to turn in a bushing 286 fitted in the gear box cover 28. The said worm gear 282 is provided with a pawl 287 (Fig. 14) held thereto by a shoulder rivet 288 and caused to engage the teeth of the said ratchet member or wheel 278 by a spring 289 held to the worm gear 282 by a screw 290.

Figure 14:
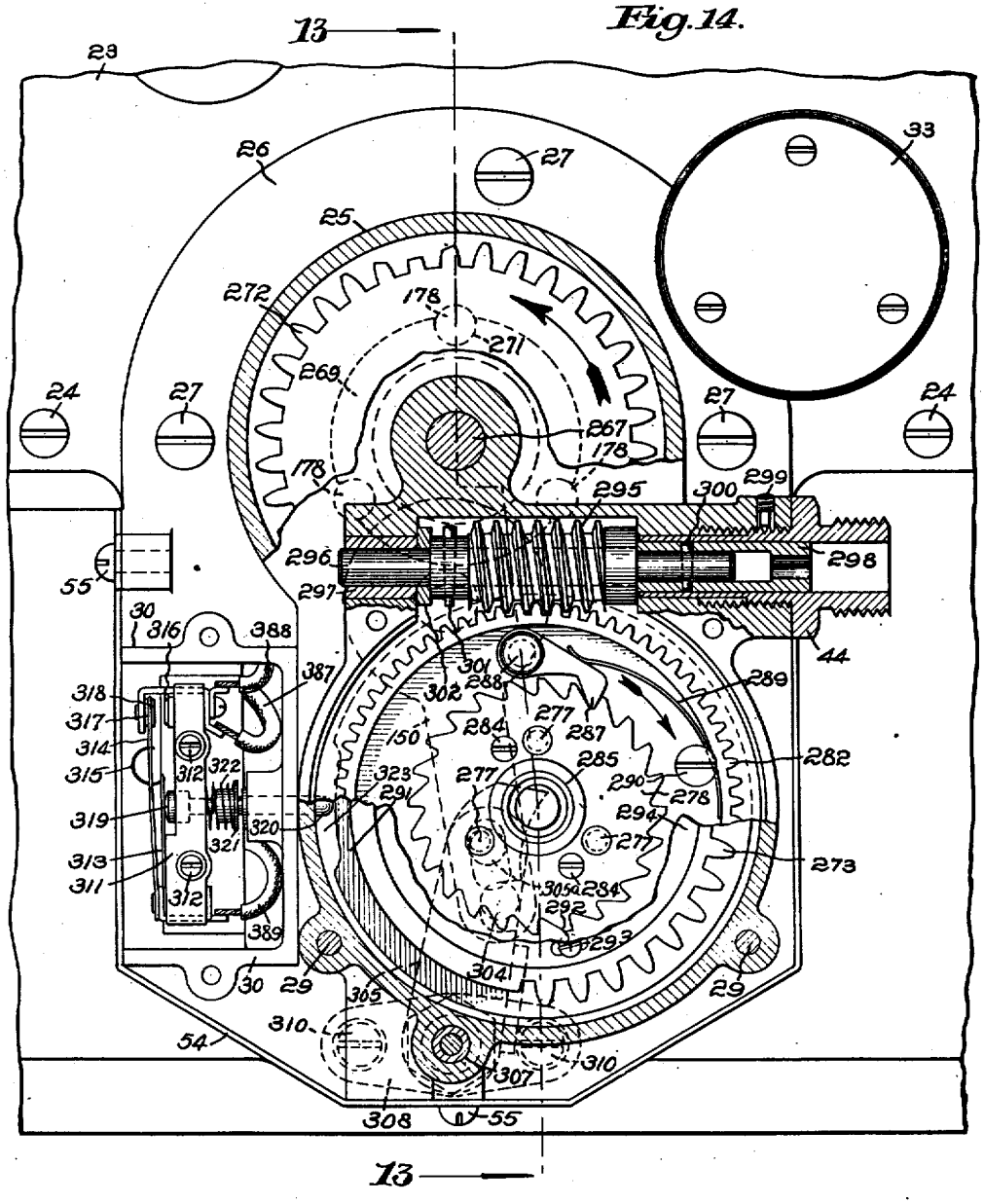
Fig. 14 is an enlarged fragmentary view similar to a part of Fig. 1, certain parts being broken away more clearly to show the operation of the mechanism.

Referring to Figs. 13 and 14, there is attached to the interrupted gear 273 a switch operating cam plate 291 held by means of three screws 292, one of which is shown in Fig. 14. The said interrupted gear 273 is provided with an elongated slot 293 (Fig. 14) to provide a small amount of adjustment of the cam plate 291 with respect to the interrupted gear 273 and under each screw head 292 is placed a washer 294.

The worm gear 282 meshes with a worm 295 carried by a shaft 296, one end whereof is free to turn in a bushing 297, and the opposite end is provided with a drive bushing or sleeve 298 free to turn in the cable connecting bushing 44 (shown in Fig. 1) and threaded into the wall of the mechanism drive unit, housing or box 25, being locked thereto by a locking screw 299 (Fig. 14). The said drive bushing or sleeve 298 is pinned to the shaft 296 by a taper pin 300, the worm 295 is pinned to the shaft 296 by a taper pin 301, and the left hand end of the said worm 295 is provided with a thrust washer 302.

The hub 285 is provided with an internal thread 303 (shown in Fig. 13) affording means for connecting a crank for hand operation of the camera, if desired. The hub 285 can be turned by hand by means of such crank without turning the worm gear 282, because of the provision of the ratchet 278 and the pawl 287. When the worm gear 282 is driven in a clockwise direction by the worm 295, the hub 276 and the gear 273 will also be turned in a clockwise direction. If for any reason the worm gear 282 were turned in a contraclockwise direction, the hub 276 and the interrupted gear 273 would remain stationary because of the provision of the ratchet 278 and the pawl 287. This provision is of a great importance, because if the camera were driven in a reverse direction, it would necessarily be seriously injured.

Referring particularly to Figs. 12, 13 and 14, the interrupted gear 273 carries a pin 304 (shown in full lines in Fig. 13 and in dotted lines in Fig. 14) for operating the shutter release at the proper time by transmitting motion from said pin 304 to the shutter release lever 150 (shown in Fig. 6 and also in Fig. 13). There is provided an operating lever or link 305 (best shown in Figs. 12 and 13) provided with a cam face 306 engaged by said pin 304, and as said pin turns in a clockwise direction it causes the operating lever or link 305 to be moved in a contraclockwise direction on a pin 307 threaded into a plate 308 and locked thereto by lock nut 309, said plate 308 being attached to one wall of the camera body 20 by screws 310 (Fig. 14).

The operating lever or link 305 is provided with a cylindrical extension or pin 305a (Fig. 13), which engages the slot 150a of the said shutter release lever 150 (Fig. 6). Thus each time that the interrupted gear 273 makes a revolution, the connecting lever or link 305 is caused to be turned in a contraclockwise direction, thus operating the shutter release lever 150 in a clockwise direction, thereby causing the capping gates 132, 133 to be operated and the shutter to be released as previously set forth.

In Fig. 14 the said pin 304 (there shown in dotted lines) is in the position it occupies when the camera is at rest after having completed a cycle of functioning movements. As the motor is started, thereby turning the worm gear 282 in a clockwise direction viewing Fig. 14, the pin 304 will be moved in a clockwise direction, and it causes the operating lever or link 305 to be turned in a contraclockwise direction by reason of the cam formation 306, the upper end of which formation is of such shape as to cause a dwell in the operating movement of lever or link 305, so as to allow the shutter curtain to run down as the worm gear 282 continues to rotate in the exposure cycle of the camera. During such dwell the capping gates 132, 133 are held open. When the pin 304 reaches the upper end of the cam formation 306, the shutter release lever 150 (Fig. 6) will be returned to its starting position in the manner previously set forth, thus closing said capping gates and allowing the idler gear 166 (Fig. 6) to mesh with the shutter rewind gear 165. The shutter curtain will therefore now be rewound and an unexposed area of the sensitized material will be moved before the exposure aperture. The said interrupted gear 273 makes one complete revolution per cycle and is then stopped by the act of breaking the electrical circuit to the driving motor. The manner of controlling the said circuit will now be described.

Referring particularly to Figs. 14 and 15, on the motor drive unit mechanism, housing or box 25 is the switch box 30 (previously referred to) and enclosed therein is a single-pole double-throw switch 311 attached to the said switch box 30 by screws 312, 312. The said switch 311 is of itself a standard switch of well known manufacture, and per se is therefore not a novel element in the present invention. It will, however, be specifically described and, as will appear, the said switch combines in a novel manner with operating parts herein disclosed in carrying out the purposes of the present invention, and is an element of novel combinations herein disclosed.

Attached to the base of the said switch 311 is a flat actuating spring 313 and a contact spring 314, and connecting said two springs is a semicircular spring 315. The contact spring 314 is caused to be moved between contacts 316 and 317 (shown in Figs. 14 and 15) when the switch 311 is operated. The contact spring 314 carries a contact 318. When a switch plug 319 therein shown is moved in a left hand direction, viewing Fig. 14, the spring 314 is also moved in a left hand direction, carrying with it the semicircular spring 315 until the end of the spring 313 passes the spring 314, which is provided with an opening for that purpose, thus changing the position of spring 315 so that a center line would be projected through the end of the spring 313 and spring 314 at the point at which the said semicircular spring 315 is connected. At this time the actuating spring 313 will be moved to the left of contact spring 314 and at the same instant said contact spring 314 will be caused to be moved to the right under the influence of spring 315, as most clearly shown in Fig. 15.

When pressure is released from the switch button 319 and the spring 313 is allowed to assum the position shown in Fig. 14, the said contact spring 314 will be caused to be moved to the left by the action of the semicircular spring 315 in a manner that need not be more fully described.

Referring to Figs. 14 and 15, in order to operate the switch 311, we have provided an an important feature of the invention an operating rod 320 that passes through the wall of the motor drive unit, gear housing or box 25 and the wall of the switch box 30, and have provided on its left end an enlarged head 321 for engaging with a spring 322, the purpose whereof is to cause said switch actuating rod 320 to follow the contour of the cam plate 291. As the said rod 320 is moved to the left, the switch operating button 319 is consequently moved to the left, causing the contact arm of the switch 311 to be moved to the right, as shown in Fig. 15.

The cam plate 291 is provided with a cut-away section or indentation 323 (most clearly shown in Fig. 14) to allow the rod 320 to move to the right when the said indentation is in alignment with said rod. In Fig. 14, the said interrupted gear 273 has made a complete revolution and the said cam indentation 323 has reached the position shown in Fig. 14, thus allowing the switch to be operated, thereby opening the electrical circuit to the motor and causing the camera to be stopped in this position, meaning that all functioning movements cease until a new cycle begins.

The camera mechanism will therefore be in the condition shown in Fig. 6, the capping gates being closed, the shutter being rewound and the take-up spool being in the stopped position.

If now the circuit be completed between the contact spring 314 and the contact 316 by means of a second switch (which will be described at a subsequent point in the description), which second switch is operated by the manual button 67 (previously referred to and shown in Fig. 2 marked "Manual"), the motor will again be set in operation to begin a new cycle, turning the interrupted gear 273 in a clockwise direction, and as soon as the indentation 323 of the cam plate 291 passes the push rod 320, the switch 311 will be operated and will be in the condition shown in Fig. 15. The auxiliary circuit just referred to can now be broken, but the camera will continue to operate until the indentation 323 again reaches the push rod 320 when the cycle will have been completed. It will be understood from the foregoing that the interrupted gear 273 will have made a complete cycle to cause the functioning parts to operate, by first operating the capping gates 132, 133 through the action of the pin 304 moving the link 305 and operating the shutter release lever 150. The said capping gates 132, 133 will during such cycle be opened and the idler gear 166 will be disengaged from the shutter rewind gear 165 (Fig. 6) and the shutter release lever 193 will be moved upwardly, thereby disengaging the dog 198 from the notch 192 of the shutter release cam 191 and the shutter curtain will run down during such cycle.

The interrupted gear 272 has not yet operated but when the teeth of the interrupted gear 273 reach the teeth of the gear 272, such latter gear will turn through 180°. However, before the teeth of interrupted gear 273 reach the teeth of interrupted gear 272, the pin 304 (Fig. 13) will have left the cam face 306 of the shutter operating link 305, allowing the capping gates 132, 133 to close and again engage the teeth of gear 166 with the teeth of the shutter rewind gear 165. When said interrupted gear 272 has turned through such one-half revolution, the interrupted portion of gear 273 will have reached the position of the cut-away teeth on gear 272. The cycle is now completed, and interrupted gear 272 will now cease from turning in either direction until interrupted gear 273 makes another cycle.

For day operation of the camera, it is necessary to have an auxiliary switch (to be subsequently referred to) connecting from the contact spring 314 to contact 316 and momentarily closing the switch 311. The camera would, in accordance with the present invention, be caused to make one complete cycle as just set forth, and if such auxiliary switch just referred to were held closed, the camera would continue to cycle without an interruption so long as unexposed film was present in the camera. Since, however, the camera herein disclosed is, by reason of our invention, also adapted for night photography and interchangeable with day photography (something not heretofore accomplished in the art), it is necessary, in carrying out our invention, to have some means for controlling the cycle of the camera—that is, to interrupt the action of the camera at the termination of a cycle, when desired, and to position the parts so that night photography may be undertaken or practiced by the camera.

In order to accomplish this novel purpose, we have provided means for holding open the capping gates 132, 133 after they have been released in a normal manner, but the latch that holds the said capping gates open, also controls an electrical switch (to be subsequently described) in the motor circuit, to stop the motor when the capping gates start to close, thus holding the capping gates open and the shutter will also be open, it having previously been set for the full aperture, as will be explained more fully when we set forth the operation of the night cycle. Therefore, the parts are now positioned for night photography.

We will at this point describe in detail the means for so latching the capping gates open, so as to permit the making of an exposure at night.

Referring particularly to Figs. 2, 4, 16, 17 and 21 to 23, to one wall of the camera body 20 (as previously described and as shown in Fig. 2) is fitted the plate 59 held to the camera body by screws 60. Onto the said plate 59 is mounted a solenoid 324 provided with a mounting bracket 325 secured to the plate 59 by screws 326. The said solenoid 324 is provided with the usual winding 327, stationary armature 328 and movable armature 329. To the upper end of said movable armature is attached a large disk 330, and between the solenoid 324 and the disk 330 is a spring 331 to cause the armature 329 to move in an upward direction. Such armature (shown separately in Fig. 18) is provided with a hook-shaped end 332 having a slot 333 fitted into which is a latching lever or member 334 shown in Fig. 19 as having a pin 335 acted on by such hook part 332. The latching lever or member 334 is provided with an elongated opening 336 on its right hand end viewing Fig. 19, and therethrough passes a pivot pin 337 (Figs. 22 and 23) carried by a boss 338 of plate 59.

In order to hold the latching lever or member 334 in the inoperative position which it occupies when making daylight exposures, there is provided simple means (shown in Figs. 22 and 23) for holding the solenoid armature 329 in its downward position against the tension of the spring 331. To accomplish this there is provided a shaft 339 passing through a hole in said plate 59 and having a collar 340 to position the shaft 339. The left hand end of said shaft is provided with an enlarged diameter 341 to the end of which is affixed a pin 342 for engaging the collar 330 of the solenoid armature 329. To the right hand end of the said shaft 339 is attached a large disk 343, and around said shaft is positioned a spring 344 enclosed by the knob 69 (previously referred to and shown in Fig. 2) which, as stated, is used for changing from day to night cycle and the reverse (as shown in Figs. 22 and 23). The said knob 69 has a shell and is provided with a pin 346 for engaging holes 347 of the plate 59. The said shaft 339 is provided with flats and the hole through the said knob 69 is of a shape to fit said shaft 339. Therefore, said shaft, the disk 343 and the knob 69 always turn together.

When the pin 346 is in the position shown in Fig. 22, the solenoid armature 329 is held down, thus holding the latching lever 334 in its inoperative position with respect to the latch plate 138, but when the pin 346 is in the position shown in Fig. 23, the solenoid armature 329 is permitted to move upwardly, thus allowing the latching lever 334 also to be moved upward so as to be in position to engage the capping gate latch plate 138 provided on the capping gate 132.

Referring to Figs. 16, 17, 21 and 23, the said plate 59 has integral therewith brackets 348, 348 to which a switch 349 is attached by screws 350, said switch being of a construction similar to that of the switch 311 (previously described) for operating the motor. It is of the single-pole double-throw type having contacts 351, 352 and a contact arm 353 having a double contact 354. The switch 349 is provided with an actuating spring member 355, a semicircular spring 356 and a plunger 357. When the control knob 69 is in the position shown in Fig. 23, the latching gate lever or member 334 will be in position to engage the latch plate 138 of the capping gate 132 when the capping gates have been opened prior to making an exposure. As the capping gates start to return to closed position after exposure has been made, the latch plate 138 on the capping gate 132 is engaged by the hook 358 of the latching lever or member 334, which will then be caused to move in a left hand direction viewing Fig. 23, thus operating the plunger 357 in a left hand direction and also actuating the spring 355, causing the switch contact arm 353 to be moved in a right hand direction viewing Fig. 17.

This will cause the motor to be stopped, thereby interrupting the cycle of the camera which heretofore, it will be understood, has been functioning to take picture after picture at the determined time interval, one for each cycle, and the camera will now be in the open condition—that is to say, viewing Fig. 20, the full aperture 129a of the shutter curtain will be before the exposure opening and the capping gates are at such time open, but since this type of exposure is used only at night, there will be little or no exposure action taking place on the sensitized material until the dropped flash bomb is ignited, at which time a suitable photo-electric cell circuit carried by the camera will be operated, closing a circuit to the solenoid winding 327, thus causing the solenoid armature 329 to be moved downward, carrying with it the hook member 332, pin 335 and latching member 334. This action will cause the hook 358 to be disengaged when the latching plate 138 of the capping gate 132, allowing both capping gates 132, 133 to be closed and the plunger 357 will be moved to the right viewing Fig. 23, by the spring member 355, thus causing contact arm 353 to be moved to the left (Fig. 16). This completes the night photography action to the extent of making one exposure.

Therefore the just described movement of the parts again completes the circuit to the motor and causes the camera to complete its cycle until the contacts are opened by the switch 311 in the manner previously described.

If a second night photograph is now to be taken, it will be done under the manual control of the operator, and the action just described will be repeated. When the knob 69 is in the position shown in Fig. 22, the latch plate 138 cannot be engaged by the hook 358, and therefore the cycle will take place in the normal manner for photography.

It is to be understood that the switch 349 is in series with the motor operating switch 311, thereby opening the motor circuit even though the circuit is closed by switch 311. This is more fully referred to at a subsequent part of the specification in the summary dealing with the wiring diagram (shown in Fig. 28).

Reference is now made to Figs. 4, 6, 22 and 23, disclosing the provision of means for causing the camera to cycle by closing a circuit to the camera motor. For this purpose we have provided a switch 359 fastened to the plate 59 by nuts 68, 68a (Figs. 2, 4 and 6). This switch is again referred to in more detail when describing the wiring diagram and the sequence of the several different types of operation.

Referring now in detail to Fig. 24, which is a bottom view of the camera with parts of the body 20 thereof cut away so as more clearly to show the location of the parts, there is attached to said body the relay bottom plate or inner member 57 provided with the housing cover 56 held thereto by screw 56a and enclosed in such housing is a relay indicated generally at 360. Such relay is used in the motor circuit for controlling the current thereto, thereby making it unnecessary for the contacts of the several switches to be of such large size as would otherwise be necessary if the relay were not used and the entire current were caused to flow through the several switches. To protect the camera wiring from failure due to short circuiting or other causes, there is provided the fuse 77 (Fig. 2), previously referred to.

Referring to Figs. 3, 4, 25 and 26, it is pointed out that a camera of the general type herein disclosed may necessarily be mounted in an inaccessible place in an aeroplane. Therefore it is highly desirable to have means for stopping the camera when the film supply is exhausted, thereby preventing wasteful use of electrical current and saving needless wear on the camera. It often happens that after the operator sets the camera in operation for continuous cycling (i. e., for day operation), he either does not have the time or for some other reason he fails or neglects to break the camera circuit. In such case the camera would keep on running indefinitely until stopped. To stop the camera, just as soon as all the sensitized film loaded therein has been used (there is no purpose in having the camera run beyond such time), there is provided automatic means to accomplish this highly desirable purpose and this will now be described, making reference to said Figs. 3, 4, 25 and 26.

In Fig. 26 is shown the right hand side of the camera magazine 21 that has attached thereto the switch cover 81, previously referred to, and enclosed within said switch cover 81 is a switch 361 held to the magazine wall by screws 362, 362, and provided with a contact 363, a contact arm 364 having a contact 365, an actuating spring 366, a semicircular operating spring 367, and a plunger 368. Said plunger 368 is acted upon by a lever 369 when said lever 369 is moved in a clockwise direction by means of a coiled spring 370, one end whereof is hooked to a pin 371 attached to said lever 369, and the other end of which is connected to a pin 372 attached to the magazine wall. The said lever 369 is connected to a shaft 373 that passes through a bushing 374 (shown in Figs. 3 and 4) in the magazine wall 84 and is locked in place by a nut 375. To the inner end of the shaft 373 is attached a rocker arm 376, shown in dotted lines in Figs. 25 and 26, and having a collar 377 and a locking screw 378, shown in Fig. 3.

Referring now to Figs. 4, 25, 26 and 27, when film is loaded in the camera and around the measuring roller 92, the lower end 376a of the rocker arm 376 will be held in contact with such film strip 120 by said coiled spring 370, as shown in Figs. 25 and 26. When such film strip leaves the measuring roller 92 and passes beyond the lower end 376a of the rocker arm 376, said lower end 376a will drop into a groove 95 of the measuring roller 92, as indicated in Fig. 25, said groove or notch being best shown in Fig. 3. This will allow the arm 369 to move into contact with the plunger 368 of switch 361, thereby moving actuating spring 366 to the left and causing contact arm 364 to be moved to the right, thus opening the circuit. The switch parts will now be in the condition shown in Fig. 25.

In order to facilitate easy loading of the film into the magazine, the rocker arm 376 can be rotated in a clockwise direction viewing Fig. 4, until the spring 370 passes the axial center of shaft 373, as shown in Fig. 27. The rocker arm 376 will then be held in this position until said film strip has been threaded into the camera. The rocker arm 376 is then returned to the position shown in Fig. 26 with the lower end 376a of the rocker arm 376 resting on said film strip 120. When contacts 363 and 365 are open, an electric circuit to the relay is open. Therefore the contacts of the relay are also open, and consequently the camera cannot be operated. It will be noted, that the lower end 376a of the rocker arm 376 protrudes beyond the end of the magazine housing when in position for loading, thus preventing the installation of the magazine cover 52 until said rocker arm 376 has been moved to the position shown in Fig. 4. If not taken care of previously, it will be automatically returned to that position by the cover in the act of placing it on the camera.

Referring to Fig. 26, to the contact arm 364 of the switch 362 is connected an electrical conductor 379, the other end whereof is connected to a binding post 380 passing through the capping gate support plate or member 121 and insulated therefrom by an insulating bushing 381. Connected to the contact 363 is an electrical conductor 382 that is itself connected to a binding post 383 that passes through capping gate support plate or member 121 and is insulated therefrom by an insulated bushing 384. Connected to said binding post 380 and on the lower side of the plate or member 121 is a second conductor 379, which actually is a continuation of the conductor 379 leading from the swich 361, and leading to the binding post 383 is a second conductor 382. Said conductors 379 and 382 are held to one wall of the camera body 20 by a clamp 385 secured to the body wall of the camera by a screw 386. The binding posts 380 and 383 are used to facilitate the removal of the magazine 21 from the camera body 20.

Referring now to Figs. 14, 15 and 24, the switch 311 is provided with conductors leading through the camera housing wall as follows. Contact 317 is provided with a conductor 387, contact 316 is provided with a conductor 388, and switch contact arm 314 is provided with a conductor 389. To conduct the circuit through the camera body 20 and yet provide ready means for disconnecting or removing the motor drive from the camera, we have provided three binding posts, one for each of the conductors 387, 388 and 389, but only two of the binding posts are shown, as the binding post for the wire 387 is cut off from view by the binding post 392. These binding posts are best shown in Fig. 24. Wire 389 is connected to a binding post 390, insulated from the camera body by suitable insulating bushings 391, and the conductor 388 is connected to a binding post 392, it also being suitably insulated by insulating bushing 393.

We will now trace the wiring from the various points or parts of the camera on the wiring diagram, Fig. 28. Wherever possible so to show them, the conductors indicated in said wiring diagram, Fig. 28, are therein shown the same in general structure as in other views throughout the drawings.

The storage battery for supplying electrical current to the camera and to the intervalometer is indicated at 394. Leading from said battery 394 are two wires 395 and 396 connecting to terminals 397 and 398, respectively, of the power supply receptacle 65. Said wires 395 and 396 make up a cable (not shown) that has a plug for connecting to said power supply receptacle 65. Leading from the terminal 397 of said receptacle 65 is a wire 399 that connects to the terminal 79 itself connected to one end of the fuse 77. To the terminal 78, connecting with the opposite end of the fuse 77, is a wire 400 that is connected to a wire 401 and to a wire 402. Said wire 401 connects with the switch terminal 403 of the switch 359. Said wire 402 is connected with wire 387 and wire 404. Said wire 404 connects with receptacle terminal 405 of the intervalometer receptacle 61, and said wire 387 connects with contact 316 of the switch 311.

Also connecting with wire 402 is a wire 406 that is connected to the terminal 407 of the relay or solenoid 360. To the contact arm 365 of the switch 361 is connected a wire 382 that leads to the terminal 409 of the switch 359, and connected to the wire 382 is a wire 410 that connects to the terminal 411 of the intervalometer receptacle 61. Connecting the terminal 412 of said intervalometer receptacle 61 is a wire 413 that connects with wires 414, 415 and 416, all being electrically connected together. Wire 413 leads to switch arm 353 and wire 414 leads from the switch arm 353 of the switch 349, and wire 415 is connected to the terminal 417 of the motor receptacle 63, and wire 416 is connected to the terminal 398 of the power supply receptacle 65. The terminal 418 of the motor receptacle 63 connects to the terminal 419 of the relay 360 by means of a wire 420. The terminal 407 is connected to contact 421 and the terminal 419 is connected to contact 422. The movable contacts 423 and 424 are connected together by wire 425. Connected to wire 389, previously referred to, is a wire 426 that connects to the terminal 427 of the signal receptacle 36, and to the terminal 428 of said signal receptacle 36 is connected to a wire 429 which connects to wire 430 and to wire 431. Said wire 430 connects to the terminal 432 of the relay or solenoid 360, and said wire 431 connects to the contact point 351 of the switch 349. The contact 352 has a wire 433 connecting with the solenoid 324. Also connecting with said solenoid 324 is a wire 434 that connects with wires 379 and 388. Said wire 388 connects with contact 317 of the switch 311, and the wire 387 connects with the contact 316 of the switch 311. The wire 387 is joined or connected to the wire 402. The contact arm 314 is connected to the wire 389, as previously stated, and is connected with wire 426 and the terminal 435.

A pilot lamp is indicated at 436 as connected with the solenoid 360 by means of wires 437 and 438 shown as connected to the terminals 427 and 428 of the signal receptacle 36. In practice, the said pilot lamp 436 would preferably be remote from the camera and be connected by a cable and plug that is in turn connected to the said signal receptacle 36. However, in some instances, said pilot lamp 436 may be mounted directly on the camera. The purpose of said pilot lamp 436 is to give indication when the camera is in operation.

To the terminal 417 and the terminal 418 respectively of the motor receptacle 63 are connected as shown wires 439 and 440. Wires 439 and 440 extend to the motor for operating the camera and constitute cable 441 that is connected to plug 442 fitted into the motor receptacle 63. Said cable 441 has a similar receptacle on its opposite end for connecting to the motor (not shown). Connected to terminals 405, 411 and 412, indicated in dotted lines, are wires 443, 444 and 445, respectively, which are connected to plug 446 (Fig. 1) itself connected to the intervalometer receptacle 61. Wires 443, 444 and 445 constitute cable 447, shown in Fig. 1 as terminating in a plug 446. Said cable 447 is connected with a standard intervalometer of any one of several different types, as, for instance, the intervalometer or time interval control device disclosed in the patent to Sherman M. Fairchild, No. 2,048,439, July 21, 1936. Or the cable 447 can be used for manually operated remote control. This will be referred to further when we describe the operation of the camera.

In the past few years there have been developed a number of time contacting devices or time-interval control devices, which are generally referred to upon the market as intervalometers. These have become more or less standardized with the armed forces of the United States, and particularly have the electrical connections to these intervalometers become standardized.

Now referring to plug 446, shown in Fig. 1, a contact 448 (indicated in the diagram Fig. 28) is always connected to the negative power supply conductor, and contact 449 (also shown in said diagram) is always connected to the positive conductor. Contact 450 (also there shown) is connected to the control circuit through conductor 444. The purpose of these intervalometers is to cause a cycle of the camera at predetermined times or at predetermined frequency, so as, for instance, to cause a picture to be made every five seconds. There are other special types of intervalometers for operating cameras at other than a repeated cycle, by which we mean that a contact may be made between conductor 443 and conductor 444 after a predetermined time interval has elapsed from the time the circuit has been closed to the intervalometer, and then a second contact takes place a predetermined time after the first contact. This cycle of operation is used in certain types of night photography.

Another manner of use of an intervalometer, which we may employ within the scope of our invention, would involve a switch across the conductors 444 and 443 at a remote location from the camera so as to cause the camera to operate at the will of the operator. Another manner of use thereof within the scope of our invention would involve a switch across conductors 443 and 444 to be closed automatically by a contact device connected with the bomb release mechanism of the aeroplane, said contact device having a time delay mechanism to cause contacts to be closed a definite time after a bomb has been released, such contact causing the camera to operate.

The first half of the night cycle will be explained presently.

We will now give a brief resume of the operation of the camera when set for day photography, and in doing so will refer mainly to Figs. 2, 6, 14, 15 and 22 and the diagram, Fig. 28.

The knob 69 is set to indicate "Day" as aligned with index 70. Manual button 67 is pressed, thus closing the circuit through switch 359. Current will thereupon flow from the positive end of battery 394 through wire 395, contact 397, wire 399, fuse 77, wires 400, 402 and 401, terminals 403 and 409, wire 382, contact 365, contact 363, wires 379 and 388, contact 317 and contact 318. The switch arm 314, Figs. 14 and 15, will be in position to allow contacts 317 and 318 to be closed because notch 323 (Figs. 14 and 15) of the cam disk 291 will be in position to allow the switch operating plunger 320 to drop into said notch 323. Current will thereupon flow through switch arm 314, wire 389, relay winding of relay 360, wire 430, wire 431, contact 351 and contact 354. Contacts 351 and 354 will be closed because cycle selecting knob 69 will be in the position for day cycle. Current will flow through contact arm 353, through wire 414, to conductor 416, to terminal 398, to wire 396 and back to the negative side of battery 394. This will have energized the solenoid winding 360, closing contacts 421, 423, 424 and 422. Current will then flow from conductor 402 through conductor 406, contacts 421, 423, 424 and 422, conductor 420, terminal 418 of motor receptacle 63, wire 440, and through the motor, back to wire 439, through terminal member 411, wire 415, wire 416, connector 398, wire 396, and to the negative side of battery 394.

The condition of the camera mechanism at the time of closing contacts will be that indicated in Fig. 6. The shutter therefore has been rewound, a new area of film has been fed into position and the camera will have stopped, the motor drive mechanism being in the condition shown in Fig. 14. As contact is made through the switch 359, the motor will start to operate, turning the worm 295 and the worm gear 282, interrupted gear 273, cam plate 291 and pin 304. As worm gear 282 continues to turn, the switch operating rod 320 will be caused to move to the left, viewing Figs. 14 and 15, thus closing contacts 316 and 318. The circuits can now be interrupted by switch 359, since contacts 316 and 318 will short circuit said switch 359, thus allowing the motor to operate continually until the circuit is broken by contacts 316 and 318 or by the gate switch 349, which, as previously stated, does not function during the day cycle. Therefore, the camera will continue to operate, and the pin 304 operates the shutter operating link 305 and the shutter release lever 150, thus opening the camera capping gates 132, 133, and at this time the shutter will also be released.

At the time the shutter is released, the interrupted portion of said gear 273 will be in mesh with cut-away teeth of the gear 272, but the camera mechanism has not yet started to operate. A continuance of rotation of said gear 273 will allow the capping gates 132, 133 to close. Shortly thereafter the teeth of said interrupted gear 273 then engage teeth of gear 272 causing said gear 272 to be turned, operating the camera mechanism so as to rewind the shutter and feed a new area of film into position for the next exposure. Said worm gear 282 will continue to operate until the cut-away portion 323 of the cam plate 291 reaches the switch operating rod 320. The circuit between contacts 318 and 316 will then be broken, thus stopping the motor and causing the camera also to be stopped, and the mechanism will now again be in position shown in Figs. 6 and 14.

The camera is set on the night cycle by turning the knob 69 so that index 70 (Fig. 2) is in alignment with the word "Night," the parts then being in the position shown in Figs. 4 and 23. If, however, the film supply is exhausted so that the lower end 376a of lever 376 is allowed to drop in the notch or recess of the measuring roller 92, thus opening switch 361 by opening contacts 363 and 365, the camera is caused to stop, since switch 361 is always in circuit regardless of the condition of the other switches. As the camera is set in operation, usually by closing the contacts from the time delay device connected with the bomb release (that is, by closing the circuit through conductors 443 and 444), the camera is set in motion in the manner just described, so that the capping gates 132, 133 open, the shutter is released and the said capping gates start to close, but are prevented from doing so by reason of the latch hook 358 of the latch member 334 engaging latch plate 138 of capping gate 132, as shown in Fig. 4 and indicated in the diagram Fig. 28. As the capping gate 132 starts to close, the switch arm 353 will be moved in an upward direction, viewing diagram Fig. 28, namely in a left hand direction viewing Figs. 4 and 23, thus opening contacts 351 and 354, since contacts 351 and 354 are in circuit as just described. The motor and also the camera will now be stopped. A short time thereafter the flash bomb will have exploded, lighting up the ground, and a portion of that light is picked up by a photo electric cell, the energy therefrom being amplified and fed into a relay, thus closing the contacts across conductors 443 and 444. The solenoid will then be connected to the negative side of the battery through wire 433, contacts 352 and 354, switch arm 353 of switch 349, wire 414, wire 416, wire 396 and to the negative side of the battery. The other side of the solenoid 324 is connected to wire 434, and current flows through wire 379, contacts 363 and 365 of switch 361, and wire 382 of switch 359, and wire 410 to the connector 411 of the receptacle 61 which is connected to the conductor 444, and conductor 443 is connected to the positive side of the battery through wires 404, 402, 400, fuse 71, wire 399, and wire 395 to the positive side of the battery.

The armature hook shaped end 332 will be moved in a downward direction viewing Figs. 4 and 23 (to the left viewing the diagram Fig. 28), Thus disengaging hook 358 from the latch plate 138, thereby releasing capping gate 132. The switch arm 353 will then be caused to move to the right, viewing Figs. 6 and 23, by means of switch actuating spring member 355, thus allowing contact lever 353 to return to a position to close contacts 354 and 351, thus again completing a circuit through the solenoid 360. The motor will now be caused to operate, thereby operating the camera to complete the second half of the cycle, thus rewinding the shutter, and feeding into position a new area of film, and when notch 323 of cam plate 291 reaches the operating pin 320, the motor will again be stopped, thus stopping the camera, as previously described.

It may be desirable to control the camera through mechanical means for making night photographs. When that is done, a contact device of the intervalometer type is provided, as hereinbefore explained, that acts first to close the contacts across conductors 443 and 444, thereby causing the camera to open (that is, to release the shutter and hold the capping gates 132, 133 open, as previously described as a part of the night cycle), and after a time interval, a contact is made between conductors 443 and 444, thus energizing the solenoid 324 and allowing the said capping gates again to be closed, putting the camera in condition for a second exposure.

As will be understood from the foregoing description, the camera is so constructed that any of these various types of cycling can be used within the scope of our invention. The intervalometers and the photo-electric cell circuit are not per se part of this invention, but a device providing the several different types of contacting means not only for the cycling just recited, but for other cycling functions, is a subject matter of another invention.

We have provided by this invention a truly universal camera for use particularly by the combat forces of the United States and others of the United Nations for making the numerous types of photographs herein indicated, so that instead of the former necessity to use several different types of cameras for the indicated different types of work, we have provided a camera that can be quickly adapted to any or all of the many different types of photography now being employed by the armed forces of the United States. It will, moreover, be understood that this camera can be used for a great number of peace-time pursuits equally well.

Although this camera is particularly intended for use as an aerial camera, certain features and combinations thereof may be uesd in cameras other than of the aerial type, and accordingly the invention is not limited to an aerial camera excepting as definitely stated in the claims.

The lever 150 corresponds to the so-called trigger or shutter release lever 40 of the said co-pending application Ser. No. 437,240, and herein it is termed the master shutter-release lever. In the present application the said master shutter-release lever 150 is operated through the motor-drive unit. We have also disclosed herein the lever 159, which, to distinguish it from the master shutter-release lever 150, we have herein termed the secondary shutter release lever, it acting to release the shutter when the capping gates approach their full open position. The said secondary shutter-release lever 159 is operatively connected, as clearly shown in the drawings, to the said master shutter-release lever 150 that is operated by the motor-drive unit.

Throughout the specification and in the claims, we have referred to the camera as one adapted for use as a daytime camera, and also adapted for use in night photography, at which time the subject to be photographed would be illuminated by flash bombs or other illumination under the control of the personnel in the aeroplane or by automatic control provided in the camera. The term "night photography" has come into general use in connection with aeroplanes, and it is well understood what is meant by such term. We have, therefore, used the expression "night photography" in that sense herein.

Having thus described one embodiment of the invention, it is to be understood that although specific terms are employed, they are used in a generic and descriptive sense and not for purposes of limitation, the scope of the invention being set forth in the following claims.

We claim:

1. An aerial, manually controllable, fully automatic, photographic camera effectively adapted both for day photography and for night photography, for which latter use a materially longer exposure time is essential for each exposure, such camera including the following cooperating parts: a camera body having an objective lens, a curtain shutter having at least one opening for day photography and a larger opening for night photography, means to support a film, film feeding means, curtain shutter releasing means controlling the running down of the curtain shutter, and curtain shutter rewinding means; an electric motor with circuiting means for automatically actuating the said film feeding means, the said curtain shutter releasing means and the said curtain shutter rewinding means, thereby effecting the performance by said cooperating parts of a functioning photographic cycle; together with means for automatically repeating such functioning cycle for day aerial photography until the film is used up or the said motor is cut off; manual control means under the immediate manual control of the operator to cause such functioning cycle to be carried out and to be automatically repeated, thereby effecting such day photography; and adjusting means having two functioning positions, and governed and actuated by such manual control means and responsive to such operator's manual alteration in the action of such control means, and co-acting with the curtain shutter releasing means and the exposure means, to cause such motor-operated camera, through the said cooperating parts that participate in the said day functioning cycle, to perform automatically a single night photographic cycle instead, with a longer exposure using said larger opening of the curtain shutter, when the adjusting means is in one of said positions, and in which night cycle the exposure time is, by the action of said adjusting means, automatically increased sufficiently to accomplish effective night photography.

2. A photographic camera effectively adapted both for day photography and for night photography, for which latter a materially longer exposure time is essential for each exposure, said camera including the following cooperating parts: a camera body having an objective lens, a curtain shutter having at least one opening for said photography and a larger opening for night photography, means to support a film back of said curtain shutter, film feeding means, shutter releasing means controlling the running down of the curtain shutter, curtain shutter rewinding means, capping gate means supported in said camera body between the curtain shutter and the objective lens, and means to open and to close said capping gate means for each exposure; an electric motor with circuiting means for automatically actuating the said film feeding means, the said curtain shutter releasing means and the said curtain shutter rewinding means, thereby effecting the performance by said cooperating parts of a functioning photographic cycle, together with means for automatically repeating such functioning photographic cycle for day photography until the film is used up or the said motor is cut off; adjustable control means having two functioning positions, and under the manual control of the operator to cause such functioning cycle to be carried out and to be automatically repeated, thereby effecting such day photography; and means governed by such manually adjustable, two functioning-position control means and responsive to such operator's manual adjustment in the action of such two functioning-position control means when in one of said positions and co-acting with the curtain shutter releasing means and the exposure means to retain the capping gate means open for film exposure for night photography for a longer time period than the time the capping gate means is normally held open for film exposure in said specified photographic cycle for day photography when in the other of said two positions, thereby providing for a materially longer exposure of the film for night photography for the photographic cycle next occurring after such manual adjustment of said governing means.

3. A combination according to claim 2 but wherein the capping gate means are capping gates provided to exclude from the film the light coming through the lens, and wherein means are provided to open said capping gates in each functioning cycle before the exposure is made, and wherein means is provided, governed by said adjustable control means, automatically to stop the motor during the performance of the single functioning cycle for night photography to permit during such motor stoppage the holding open, by the action of said adjustable control means, of said capping gates for a longer period.

4. A combination according to claim 2 but wherein the capping gate means are capping gates provided to exclude from the film the light coming through the lens and wherein means are provided to open said capping gates in each functioning cycle before the exposure is made, wherein means is provided, governed by said adjustable control means, automatically to stop the motor during the performance of the single functioning cycle for night photography, and wherein means is provided, governed by said adjustable control means, automatically to latch open said capping gates to prolong the admission of light to the film.

5. A combination according to claim 2 but wherein the capping gate means are capping gates provided to exclude from the film the light coming through the lens and wherein means are provided to open said capping gates in each functioning cycle before the exposure is made, wherein means is provided, governed by said adjustable control means, automatically to stop the motor during the performance of the single functioning cycle for night photography, and wherein means is provided, governed by said adjustable control means, to latch open and then to unlatch said capping gates so as to prolong the admission of light to the film.

6. A combination according to claim 1, but wherein driving means is provided in the camera body and operatively connected to said electric motor to operate the said cooperating parts in the accomplishment of said functioning photographic cycles, and wherein a cam is rotated by said driving means, and wherein a rod 320 is moved in accordance with the shape of said cam, and wherein a motor-stopping switch in said circuiting means is controlled by the movements of said rod 320 to stop said motor at the end of a day photographic cycle.

7. A combination according to claim 1, but wherein driving means is provided in the camera body and operatively connected to said electric motor to operate the said cooperating parts in the accomplishment of said functioning photographic cycles, and wherein said driving means for operating the functioning parts includes intermeshing gears 272, 273 with interrupted teeth, said gear 273 having a pin 304, and wherein there is a lever 305 moved by said pin 304 and provided with a pin 158, and wherein there is a master shutter release lever 150 operated by said pin 158.

8. A combination according to claim 1, but wherein driving means is provided in the camera body and operatively connected to said electric motor to operate the said cooperating parts in the accomplishment of said functioning photographic cycles, and wherein said driving means for operating the functioning parts includes intermeshing gears with interrupted teeth to provide intermittent motion, and wherein there is provided a shutter release lever controlled in operation by and operated periodically from said intermeshing gears.

9. A combination according to claim 1, but wherein driving means is provided in the camera body and operatively connected to said electric motor to operate the said cooperating parts in the accomplishment of said functioning photographic cycles, and wherein there are provided capping gates to exclude from the film the light coming through the lens, and wherein said driving means for operating the functioning parts includes intermeshing gears with interrupted teeth to provide intermittent motion and operating connections between said intermeshing gears and said capping gates and shutter release means, whereby a single revolution of the second of said intermeshing gears acts to open said capping gates and release the shutter.

10. A combination according to claim 1, but wherein driving means is provided in the camera body and operatively connected to said electric motor to operate the said cooperating parts in the accomplishment of said functioning photographic cycles, and wherein there are provided capping gates to exclude from the film the light coming through the lens, and wherein said driving means for operating the functioning parts includes intermeshing gears with interrupted teeth to provide intermittent motion and operating connections between said intermeshing gears and said capping gates and shutter release means, whereby a single revolution of the second of said intermeshing gears acts to open said capping gates and release the shutter, and wherein there are provided means for stopping the electric motor once for each revolution of the second of said intermeshing gears and controlled by said second of said intermeshing gears.

11. A combination according to claim 1, but wherein driving means is provided in the camera body and operatively connected to said electric motor to operate the said cooperating parts in the accomplishment of said functioning photographic cycles, and wherein a cam is rotated by said driving means, and wherein there is a main switch in said circulating means, the opening whereof stops said motor, and wherein means is provided that is moved by said cam to open said switch, and wherein a second switch is provided controlled manually by button 67 for the purpose of completing the circuit again to start the motor and thereby turn the second of said interrupted gears and close the said main switch.

12. A combination according to claim 1, but wherein driving means is provided in the camera body and operatively connected to said electric motor to operate the said cooperating parts in the accomplishment of said functioning photographic cycles, and wherein there is a main switch that is automatically opened and closed, once for each cycle, to stop and start the motor, and wherein there is an auxiliary switch, governed by said manual control means, to stop the camera functioning operations at the end of each cycle, which auxiliary switch, if kept closed, permits the camera to continue to cycle, but by the opening of which auxiliary switch the camera is stopped at the end of a cycle, and wherein capping gates are provided to exclude from the film the light coming through the lens, and wherein latching means are provided, governed by said manual control means, to hold open said capping gates through the act of opening said auxiliary switch, instead of immediately closing at the end of each cycle, if said auxiliary switch is not opened.

13. A combination according to claim 1, but wherein driving means is provided in the camera body and operatively connected to said electric motor to operate the said cooperating parts in the accomplishment of said functioning photographic cycles, and wherein there is a main switch that is automatically opened and closed, once for each cycle, to stop and start the motor, and wherein there is an auxiliary switch, governed by said manual control means, to stop the camera functioning operations at the end of each cycle, which auxiliary switch, if kept closed, permits the camera to continue to cycle, but by the opening of which auxiliary switch the camera is stopped at the end of a cycle, and wherein capping gates are provided to exclude from the film the light coming through the lens, and wherein latching means are provided, governed by said manual control means, to hold open said capping gates through the act of opening said auxiliary switch, instead of immediately closing at the end of each cycle, if said auxiliary switch is not opened, and another switch in said circuiting means, the opening of which switch by the operator stops the said motor, whereby the camera functioning parts are held ready for night photography.

14. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, and means to hold said capping gates open for a lengthened time interval in substantial synchronism with the presentation of said larger opening of the curtain shutter to said objective lens.

15. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, latching means for holding open said capping gates, and means to render said latching means effective to hold said capping gates open for a lengthened time interval in substantial synchronism with the presentation of said larger opening of the curtain shutter to said objective lens, thereby rendering said camera suitable for night photography.

16. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, a latch adapted to engage one of said capping gates to hold them open for a lengthened time interval in substantial synchronism with the presentation of said larger opening of the curtain shutter to said objective lens, and a switch in the circuiting means, the movement whereof opens contacts therein and effects the engagement of said latch to hold said gates open, and also stops said electric motor.

17. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, a latch adapted to engage one of said capping gates to hold them open for a lengthened time interval in substantial synchronism with the presentation of said larger opening of the curtain shutter to said objective lens, a switch in the circuiting means, the movement whereof opens contacts therein and effects the engagement of said latch to hold said gates open, and also stops said electric motor, and means to disengage said latch from such capping gate, so that said capping gates are thereby permitted to close.

18. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, a latch adapted to engage one of said capping gates to hold them open for a lengthened time interval in substantial synchronism with the presentation of said larger opening of the curtain shutter to said objective lens, a switch in the circuiting means, the movement whereof opens contacts therein and effects the engagement of said latch to hold said gates open, and also stops said electric motor, and means controllable by a light-sensitive element to effect the closing of contacts, the completing of the circuit and the disengagement of the latch from such capping gate, so that the capping gates at once close.

19. An aerial camera having a curtain shutter with two different sized exposure openings and releasing means for said curtain shutter, and having an objective lens, a pair of capping gates between said curtain shutter and said objective lens to exclude from the film the light coming through the objective lens, and also having means to rewind the curtain shutter and to feed film for new exposures, and an electric motor with battery and circuiting means, to operate functioning parts of the camera in the making of an exposure, including the releasing of said curtain shutter and the act of opening and closing said capping gates that occupies a certain time interval, a latch adapted to engage one of said capping gates to hold them open for a lengthened time interval in substantial synchronism with the presentation of said larger opening of the curtain shutter to said objective lens, a switch in the circuiting means, the movement whereof opens contacts therein and effects the engagement of said latch to hold said gates open, and also stops said electric motor, and means controllable by a light-sensitive element to effect the closing of contacts, the completing of the circuit and the disengagement of the latch from such capping gate, so that the capping gates at once close, and whereby the electric motor is again operated to rewind the curtain shutter and feed the film, thereby completing a functioning cycle.

20. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, and means to hold said capping gates open for a lengthened time interval in substantial synchronism with the presentation of said larger opening of the curtain shutter to said objective lens and then to permit said gates immediately to close and a functioning cycle to be completed, said means including the following co-operating parts, viz., a latch hook 358 positionable to engage one of the capping gates, the said circuiting means having therein a contact arm 353, and contacts 351 and 354 controlled by said contact arm, and a solenoid relay also in the said circuiting means for positioning the latch hook 358 out of engagement with said one of the capping gates, and switch means 349 to close the circuit across said contacts 351 and 354.

21. An aerial camera having a curtain shutter with two different sized exposure openings and releasing means for said curtain shutter, and having an objective lens, a pair of capping gates between said curtain shutter and said objective lens to exclude from the film the light coming through the objective lens, and an electric motor with battery and circuiting means, to operate functioning parts of the camera in the making of an exposure, including the releasing of said curtain shutter and the act of opening and closing said capping gates that occupies a certain time interval, latching means for said capping gates, and means to render said latching means effective to hold said capping gates open for a lengthened time interval in substantial synchronism with the presentation of said larger opening of the curtain shutter to said objective lens, thereby rendering said camera suitable for night photography, and means for permitting said capping gates then to close, said means including a contact device of the intervalometer type for releasing the curtain shutter and for closing contacts in the circuiting means thereby permitting the capping gates to close.

22. An aerial photographic camera effectively adapted for both day photography and for night photography, for which latter a materially longer exposure time is essential for each exposure, such camera having a casing and having a curtain shutter with releasing means, said curtain shutter having at least one small exposure opening for use in day photography and a larger exposure opening for use in night photography, means to support a film, film feeding means, and curtain shutter rewinding means, an electric motor to actuate the said several specified means, thereby to constitute a cycle of photographic functioning acts and including means for automatically repeating said cycle so long as the motor runs, circuiting means including electric wiring, contact switches and storage battery means for operating said motor, whereby the camera is adapted for day photography using a small exposure opening of the curtain shutter, and adjusting means under manual control of the operator for modifying one or more cycles so as thereby to effect night photography, such modifying means including means automatically acting through said adjusting means upon the curtain shutter to position the larger exposure opening thereof for exposure of film therethrough a sufficient length of time for an effective night exposure, and including means whereby the rewinding of the curtain shutter and the feeding of the film is controlled by a light-sensitive element acted on by light rays from the vicinity of the object to be photographed at night.

23. A structure in accordance with claim 2, but wherein the means for opening and closing the capping gate means, which means is operated by the electric motor, includes a worm and worm gear and intermeshing interrupted gear members driven by said worm gear, and also includes operative connections from said interrupted gears to said capping gate means.

24. A structure in accordance with claim 2, but wherein the means for opening and closing the capping gate means, which means is operated by the electric motor, includes intermeshing interrupted gear members driven by said electric motor and also includes operative connections between said capping gate means and said interrupted gears, said operating connections including a master shutter-release lever 150, a gear driven by said lever, and link means operated by said last mentioned gear and connected to said capping gate means respectively.

25. A structure in accordance with claim 2, but wherein the means for opening and closing the capping gate means, which means is operated by the electric motor, includes intermeshing interrupted gear members driven by said electric motor, and also includes operative connections between said capping gate means and said interrupted gears, said operating means including a master shutter-release lever 150, gear 149 and pinion 148 turned thereby, a disk 147 turned by said gear and pinion, and links operatively connecting said disk 147 and said capping gate means respectively.

26. A structure in accordance with claim 2, but wherein the means for opening and closing the capping gate means, which means is operated by the electric motor, includes intermeshing interrupted gear members driven by said electric motor and also includes operative connections between said capping gate means and said interrupted gears, said interrupted gears including one gear having a plurality of teeth cut away at the two sides opposite each other, and a second interrupted gear intermeshing therewith and having teeth only on one segment of its periphery.

27. A structure in accordance with claim 2, but wherein the means for opening and closing the capping gates, which means is operated by the electric motor, includes intermeshing interrupted gear members driven by said electric motor and also includes operative connections between said capping gate means and said interrupted gears, said interrupted gears including one gear having a plurality of teeth cut away at the two sides opposite each other, and a second interrupted gear intermeshing therewith and having teeth only on one half of its periphery.

28. A structure in accordance with claim 2, but wherein the means for opening and closing the capping gate means, which means is operated by the electric motor, includes two intermeshing interrupted gears 272 and 273, and wherein said interrupted gear 272 is turned through 180° by the time the teeth of interrupted gear 273 reach the teeth of gear 272.

29. A structure in accordance with claim 2, but wherein the means for opening and closing the capping gate means, which means is operated by the electric motor, includes an interrupted gear 272 having a plurality of its teeth cut away at each side opposite each other, and also includes a second intermeshing interrupted gear 273 having teeth on only one-half its periphery, whereby when interrupted gear 272 has been turned through one-half a revolution the interrupted portion of the intermeshing gear 273 will have reached the position of the cut away teeth on gear 272, thereby completing a cycle, so that the interrupted gear 272 will cease from turning in either direction until the interrupted gear 273 makes another cycle.

30. A combination according to claim 2, but wherein the camera is provided for such capping gate means with capping gates operated by said motor to exclude from the film the light coming through the lens, and wherein there is provided a co-acting main drive or master gear 177 driven by said motor and a pair of co-acting intermeshing interrupted gears 272, 273 in train with said master gear 177 and driven by said motor and acting by reason of said interrupted gear to drive said master gear intermittently.

31. A combination according to claim 2, but wherein the camera is provided for such capping gate means with capping gates operated by said motor to exclude from the film the light, coming through the lens, and wherein there is provided a co-acting main drive or master gear 177 and a pair of co-acting intermeshing interrupted gears 272, 273 in train with said master gear 177 and driven by said motor and acting by reason of said interrupted gear to drive said master gear intermittently, and wherein there is provided a worm gear and worm between said motor and said interrupted gears to drive said interrupted gears.

32. A combination according to claim 2, but wherein latching means governed by said adjustable control means are provided to hold said capping gates open for such longer time period.

33. A combination according to claim 2, but wherein said capping gate means includes a pair of capping gates between the curtain shutter and the objective lens, and wherein there are provided latching means governed by said adjustable control means to hold said capping gates open for such longer time period, and wherein means is provided in such electric circuit and governed by said adjustable control means to operate said latching means.

34. A combination according to claim 1, but wherein the camera is provided with capping gate means between the curtain shutter and the objective lens and is provided with means operated by said electric motor to open and to close such capping gate means for each exposure.

35. A combination according to claim 1, but wherein the camera is provided with capping gate means between the curtain shutter and the objective lens and is provided with means operated by said electric motor to open and to close such capping gate means for each exposure, and wherein the camera is provided with means governed by said adjustable control means to retain the capping gate means open for night photography for a longer time period than the time period that said capping gate means is held open in the specified photographic cycle for day photography.

ARCHIE H. GOREY.
LOUIS D. NADEL.
REYNOLD J. NITSCH.
OSCAR STEINER.